US010253468B1

(12) United States Patent
Linville et al.

(10) Patent No.: US 10,253,468 B1
(45) Date of Patent: *Apr. 9, 2019

(54) PAVEMENT MARKER MODULES

(71) Applicant: EVOLUTIONARY MARKINGS, INC., Boise, ID (US)

(72) Inventors: Thomas R. Linville, Boise, ID (US); Douglas L. Baker, Boise, ID (US); Charles L. King, Meridian, ID (US)

(73) Assignee: Evolutionary Markings, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,138

(22) Filed: May 1, 2018

Related U.S. Application Data

(63) Continuation-in-part of application No. 15/624,340, filed on Jun. 15, 2017, now Pat. No. 9,959,754, which is a continuation-in-part of application No. 14/988,331, filed on Jan. 5, 2016, now Pat. No. 9,702,098, which is a continuation-in-part of
(Continued)

(51) Int. Cl.
| | |
|---|---|
| *E01F 11/00* | (2006.01) |
| *E01F 9/20* | (2016.01) |
| *E01F 9/559* | (2016.01) |
| *E01F 9/40* | (2016.01) |
| *G08G 1/16* | (2006.01) |
| *G08G 1/01* | (2006.01) |
| *G08G 1/081* | (2006.01) |
| *G08G 1/056* | (2006.01) |
| *G08G 1/07* | (2006.01) |
| *G08G 1/0967* | (2006.01) |

(Continued)

(52) U.S. Cl.
CPC ............... *E01F 11/00* (2013.01); *E01F 9/20* (2016.02); *E01F 9/40* (2016.02); *E01F 9/559* (2016.02); *F21S 9/037* (2013.01); *G08G 1/0116* (2013.01); *G08G 1/0145* (2013.01); *G08G 1/056* (2013.01); *G08G 1/075* (2013.01); *G08G 1/081* (2013.01); *G08G 1/0965* (2013.01); *G08G 1/096725* (2013.01); *G08G 1/166* (2013.01)

(58) Field of Classification Search
CPC ..... E01F 9/40; E01F 9/50; E01F 9/578; E01F 9/60; E01F 9/602; E01F 9/604; E01F 9/608; E01F 9/615; E01F 11/00; G08G 1/09; G08G 1/095
See application file for complete search history.

(56) References Cited

U.S. PATENT DOCUMENTS 9,702,098 B1 * 7/2017 King .................... E01F 9/40
9,959,754 B1 * 5/2018 King .................... G08G 1/095

\* cited by examiner

*Primary Examiner* — Curtis B Odom
(74) *Attorney, Agent, or Firm* — Scott D. Swanson; Shaver & Swanson, LLP

(57) ABSTRACT

A traffic control system and method in which a sensor and processor interact with at least one road module to illuminate and/or cause to flash in response to predetermined road surface and/or traffic conditions. The system and method can be configured to interact with vehicles, including autonomous vehicles, traveling on the road in which the road module(s) are embedded. The road surface and/or traffic conditions include an EMS vehicle located in proximity to a fire hydrant, vehicle located in proximity to a bus stop, a vehicle located in proximity to an intersection with a bicycle and/or pedestrian path intersecting with said road in which said road modules and/or one or more light strips are embedded.

16 Claims, 30 Drawing Sheets

Related U.S. Application Data application No. 14/595,600, filed on Jan. 13, 2015, now Pat. No. 9,399,844.

(60) Provisional application No. 61/928,602, filed on Jan. 17, 2014, provisional application No. 61/926,616, filed on Jan. 13, 2014.

(51) Int. Cl.
*G08G 1/0965* (2006.01)
*F21S 9/03* (2006.01)

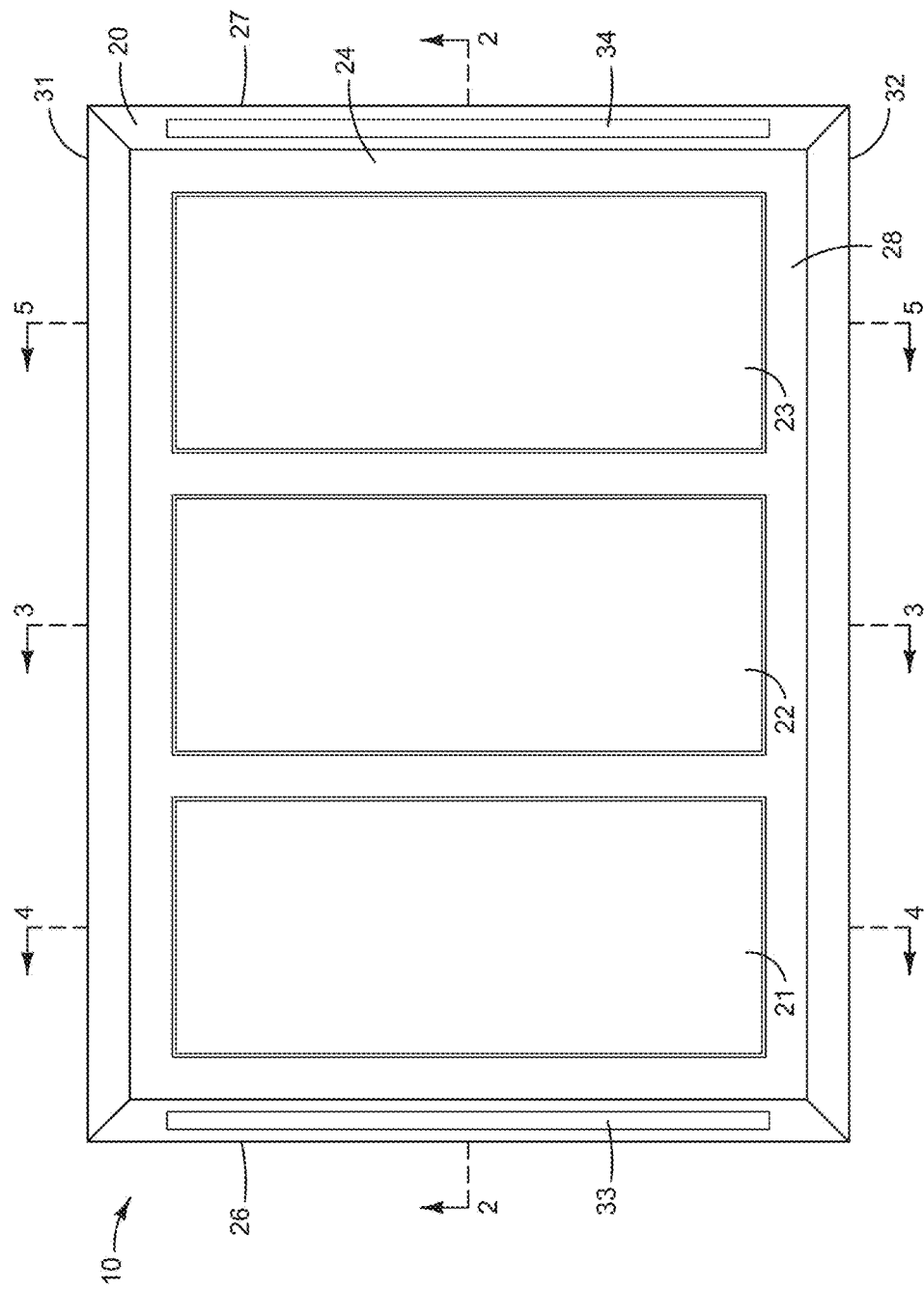

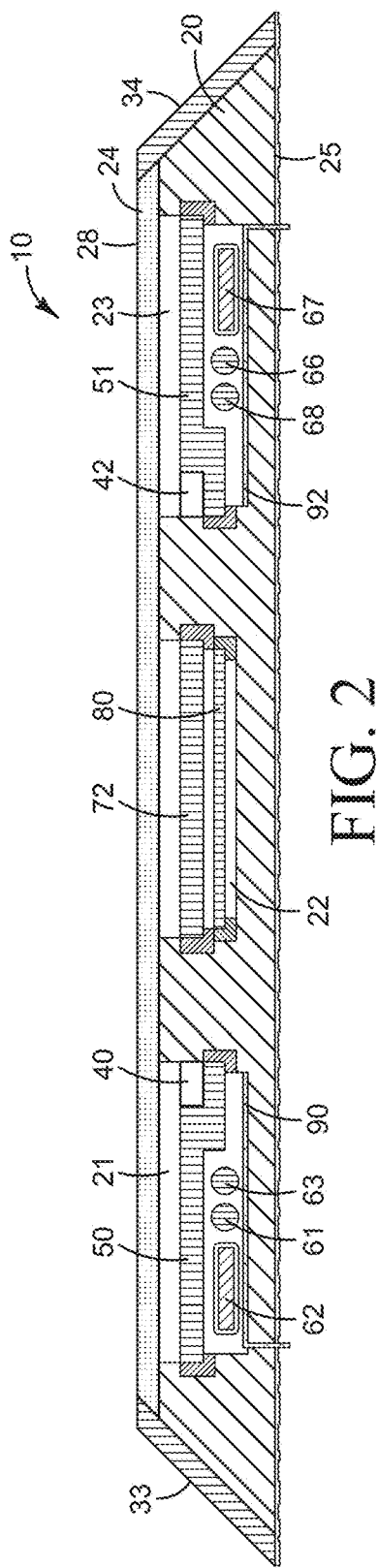
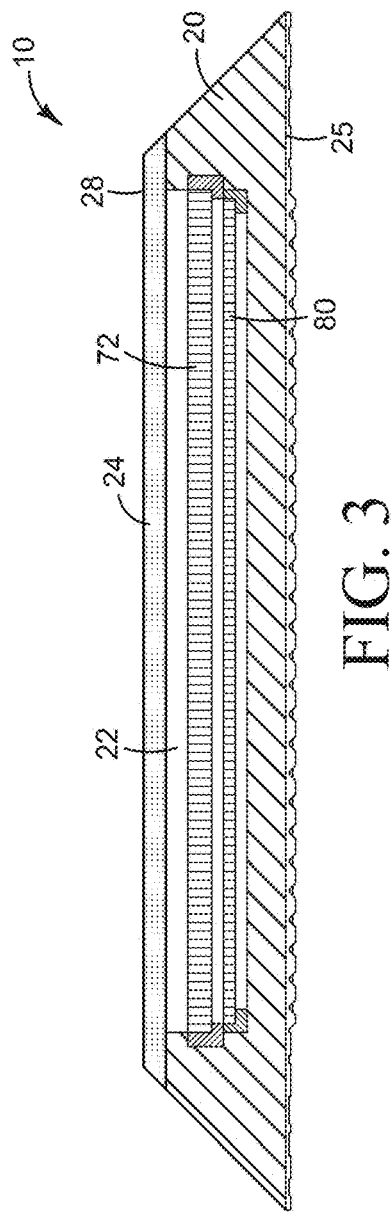

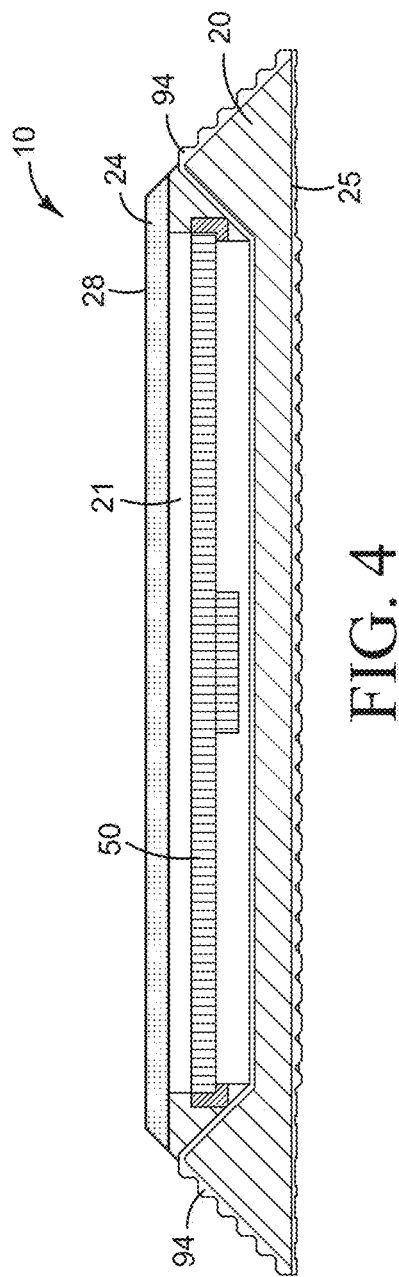
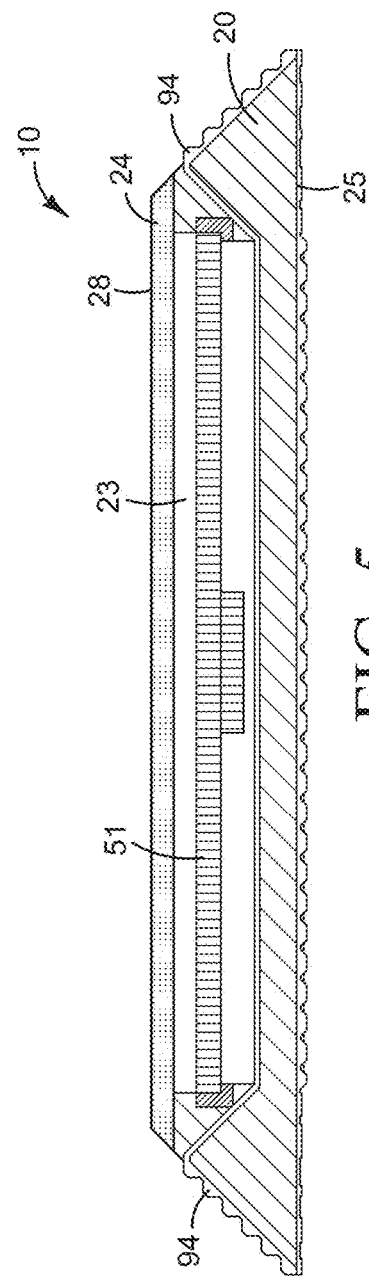

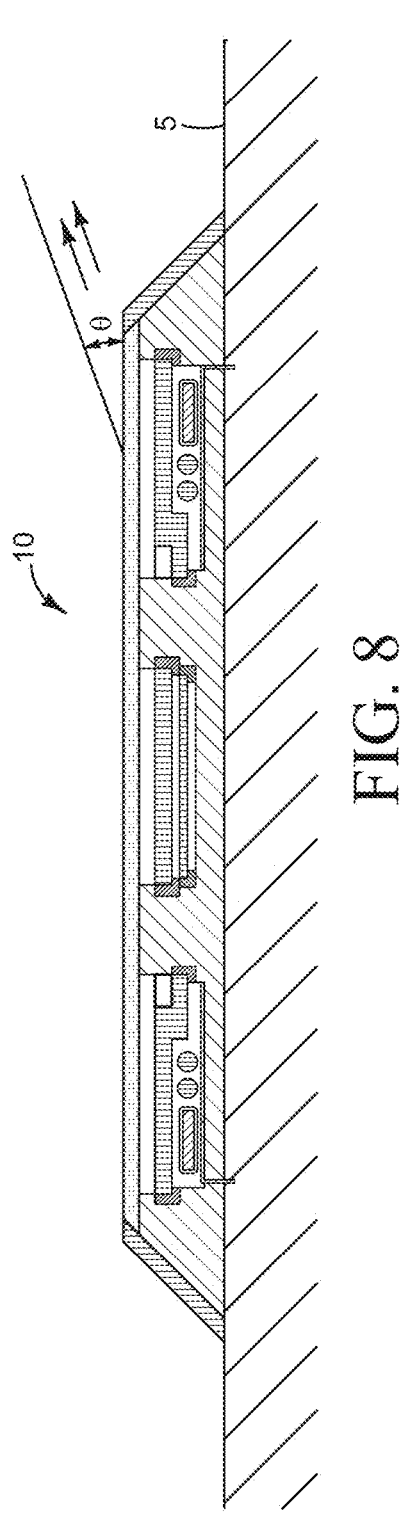
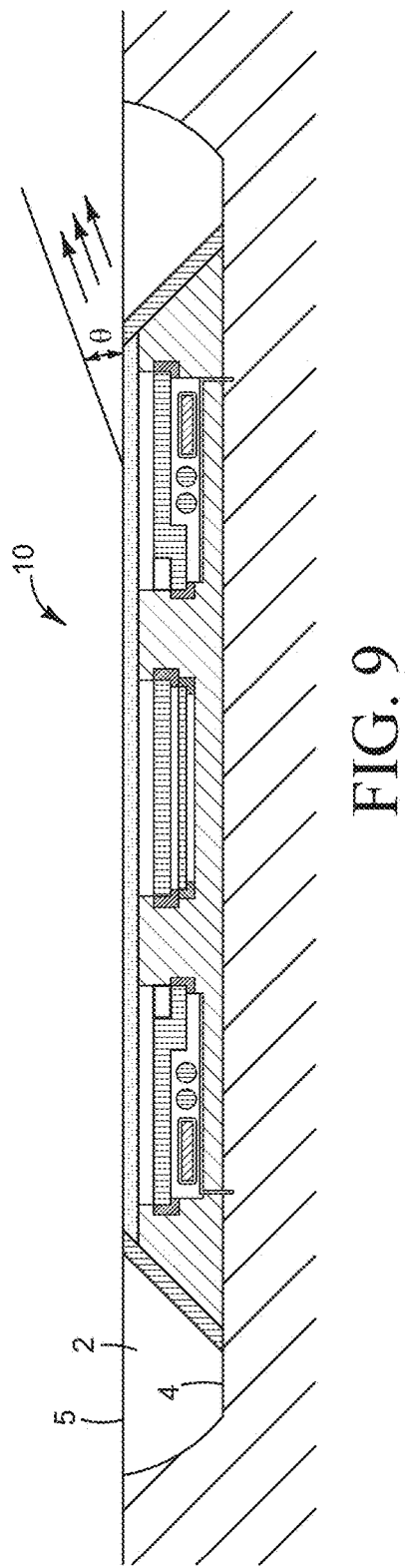
FIG. 8
FIG. 9

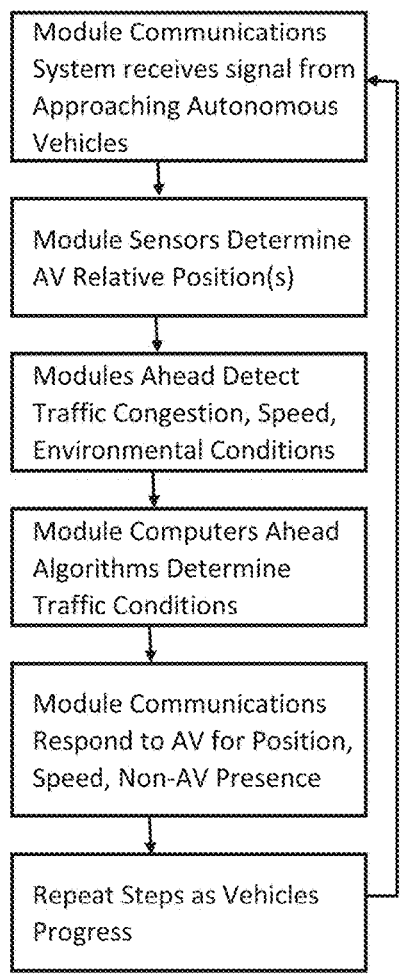
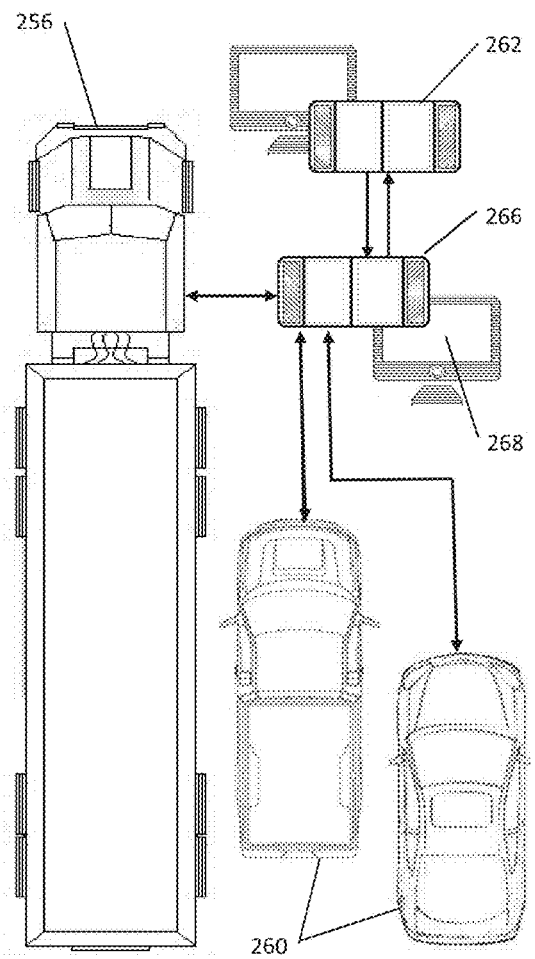
FIG. 29

PAVEMENT MARKER MODULES

PRIORITY/CROSS-REFERENCE TO RELATED APPLICATIONS

This application claims the benefit of U.S. Non-Provisional application Ser. No. 15/624,340, filed Jun. 15, 2017, which claims the benefit of U.S. Non-Provisional application Ser. No. 14/988,331, filed Jan. 5, 2016, which claims benefit to U.S. Non-Provisional application Ser. No. 14/595,600, filed Jan. 13, 2015, which claims the benefit U.S. Provisional Application No. 61/926,616, filed Jan. 13, 2014, and U.S. Provisional Application No. 61/928,602, filed Jan. 17, 2014, the disclosures of which are all incorporated by reference.

TECHNICAL FIELD

The disclosure generally relates to the field of road safety, and particular embodiments relate to systems or methods of managing traffic.

SUMMARY OF THE DISCLOSURE

Disclosed herein is a system and method of managing traffic with the use of pavement marker modules, in particular exemplary pavement marker modules thought to be preferred for use in the system. Exemplary pavement marker modules can be used for enhancing or replacing line striping and other applications such as crosswalks, parking lots, bridges, barriers, and specialty applications at road intersections. Exemplary pavement marker modules can also be used for roads, highways, tunnels, airports, port and trucking facilities, and anywhere else vehicles operate on a ground surface. Exemplary pavement marker modules provide delineation of operating lanes and hazards alongside the lanes or facility, and can reduce accidents resulting from loss of visibility of facility and erring from a safe path. Exemplary pavement marker modules can also increase efficiency of operations in facilities by allowing quicker movements of vehicles due to clarity of safe paths for that movement.

What is disclosed is a method of providing enhanced traffic signaling in response to road surface conditions and/or traffic conditions. In an embodiment, the method includes the step of providing a plurality of road modules and/or one or more light strips having a light configured for illumination and de-illumination. The road modules and/or one or more light strips are embedded in or affixed to the surface of a road within the road lines delineating road lanes and each module comprises a receiver configured for wirelessly communicating with a processor. The road modules and/or one or more light strips can be embedded in or affixed to a road surface within or proximate to lines or striping delineating roadway traffic lanes. The road modules and/or light strips can be embedded in or affixed to the road surface spanning a partial lane of travel, a complete lane of travel, or across the entire roadway. Two or more light strips can be positioned adjacent to one another in a lane to provide the appearance of a continuous light strip. In a preferred embodiment the road modules and/or light strips comprise a plurality of lights thereto. In a further preferred embodiment the lights are LED lights and/or another type of light source. The road module is configured to illuminate, change color, and/or flash in response to communication from the processor. In a preferred embodiment, the road modules and/or one or more light strips comprise at least one sensor configured to sense when a vehicle departs from a road lane delineating the proper travel vector for a vehicle. In a preferred embodiment, the sensor communicates the position of the road module to an onboard computer of a vehicle traveling on the road. In a preferred embodiment, the method further includes the step of providing at least one sensor configured for detection of at least one road condition selected from the group consisting of road surface conditions and traffic conditions of the road in or on which the road modules and/or one or more light strips are positioned. In a preferred embodiment, the sensor is configured to communicate with a processor and coordinate the illumination of road markers in the road lane lines in the direction of travel of the vehicle that has departed from the road travel lane. In a preferred embodiment, the sensor s located in a roadway module and is configured to sense the presence of a vehicle traveling in the wrong direction. In a preferred embodiment, at least one sensor is configured for detection of ice on the road, water on the road, livestock on the road, pedestrians on the road, and/or foreign objects on the road.

In a preferred embodiment, the method further includes the step of providing at least one processor in connection with the sensor and in wireless connection with a plurality of road modules and/or one or more light strips, wherein the sensor is configured to activate lights of the road modules and/or one or more light strips to illuminate when a predetermined road surface condition and/or predetermined traffic condition is met on the road. In a preferred embodiment, at least one processor is configured to communicate with a vehicle when the vehicle is traveling outside of its lane of travel and/or in the wrong direction and is configured to illuminate a plurality of road markers in response to a vehicle traveling outside of its lane of travel or in the wrong direction. In a preferred embodiment, a sensor configured to direct a variable message traffic sign to display a message commensurate with road conditions and/or traffic conditions as sensed by the sensor is provided as is a processor configured to contact traffic authorities and provide them with notice of road conditions and traffic conditions. In a preferred embodiment, this step includes a processor which directs a vehicle to alter its trajectory or speed due to the presence of road surface conditions and/or traffic conditions of the road and a processor is configured to direct a road surface module to emit a pre-selected light color when a pre-selected road surface condition and/or traffic condition occurs.

In a preferred embodiment, the method further includes the step of sensing via sensor at least one condition selected from the group consisting of road surface conditions and traffic conditions and coordinating via the processor the illumination and de-illumination of road modules and/or one or more light strips in response to the occurrence of a predetermined road surface condition and/or predetermined traffic condition occurring on the road.

In a preferred embodiment, the method of providing enhanced traffic signaling comprises the step of providing a traffic control light on the road with which a processor communicates and coordinates illumination of road modules and/or one or more light strips with the illumination of the traffic control light. In a preferred embodiment, the traffic control light comprises a green light, a yellow light, and a red light and at least one processor is configured to coordinate the illumination of road modules and/or one or more light strips with an illuminated color of the multi-colored traffic control light or signal controller thereby synchronizing the colors appearing on the plurality of road modules and/or one or more light strips with the colors being exhibited on the signal controller to improve driver response and safety.

In another embodiment, what is disclosed is a method of providing enhanced traffic signaling in response to road surface conditions and/or traffic conditions. In an embodiment, the method includes the step of providing a plurality of road modules and/or one or more light strips, wherein the road modules and/or one or more light strips comprise a light configured for illumination and de-illumination, and the road modules and/or one or more light strips are embedded in or affixed to the surface of a road in a road lane designated for vehicles traveling in a first direction. In a preferred embodiment, the road modules and/or one or more light strips comprise a receiver configured for communicating with a processor either wired or wirelessly, wherein a road module is configured to illuminate, change color, or flash in response to communication from a processor. In a preferred embodiment, a plurality of road modules and/or one or more light strips embedded in or affixed to the road surface illuminate, flash, create an "X" across the roadway, spell WRONG WAY and/or other appropriate message and/or direct an appropriate message on a roadside sign and are embedded in or affixed to a lane of an interstate highway ramp. In a further preferred embodiment the notification system and method for alerting a vehicle that it is traveling in the wrong way in a lane of traffic further notifies vehicles at an upstream point in the lane of traffic. For example, if the wrong way notification system is provided at an interstate off ramp, the technology can configured in communication with lights, traffic signals, automatic gates, or other mechanism for preventing traffic from entering at on-ramps to the roadway. Alternatively light strips and/or road modules can be positioned directing traffic to exit an interstate, pull over and/or stop when a vehicle is traveling in the incorrect direction on that roadway. This will assist in protecting vehicles and occupants thereto traveling in a vehicle in a correct direction from colliding with a vehicle traveling in the wrong direction.

In a preferred embodiment, the method further includes the step of providing at least one sensor configured for detection of a vehicle traveling in a direction generally opposite to the first direction. In a preferred embodiment the sensor is integral in a road module.

In a preferred embodiment, the method further includes the step of providing at least one processor in connection with a sensor and in wireless connection with a plurality of road modules and/or one or more light strips, wherein a processor is configured to activate the lights of road modules and/or one or more light strips to illuminate when a vehicle is traveling in a road lane in a generally opposite direction to the first direction.

In a preferred embodiment, the method further includes the step of sensing via sensor a vehicle traveling in a traffic lane in a generally opposite direction to the first direction and sending a signal via a processor to road modules and/or one or more light strips to illuminate and/or flash in response to a vehicle traveling in a road lane in a generally opposite direction to the first direction.

It is thought that a preferred marker module or road module utilized in the system or method will contain an autonomous wireless communications and software system, along with speed, weight, and environmental sensors, to coordinate with traffic signals and other highway management systems including signals, signs, highway warning systems and Traffic Management Centers (TMC), other vehicles including Emergency Management System (EMS) vehicles, Autonomous Vehicles and AV Infrastructure. The system may also communicate with other wireless systems to provide for interlinks between modules and network operations, including both ground based and satellite systems.

For example, the module or a linked detection system would detect a vehicle entering the wrong way onto a freeway off ramp, triggering a red flash warning mode significantly more visible to an impaired driver than standard signs above the impaired vision level.

In another example, the module would communicate with an automated vehicle truck platoon (multiple trucks in draft positions behind a lead truck) to provide speed and congestion data ahead to allow the platoon to adjust speed and spacing to maximize fuel efficiency and minimize time delay.

In another example, the modules would be in wireless and/or wired communication with and synchronized with a signal controller, and upon activation of a green phase, the modules on the "green to go" lanes would light through the intersection, while opposing or cross lanes would remain dark; further, modules on the stop bar at the approach to the signal would be green, while modules on opposing or cross lane stop bars would be red. This synchronization would clearly demark active (go) and inactive (stop) lanes, greatly improving driver response and safety.

In another example, the module would detect temperature, precipitation or icing and communicate with warning signs to provide flashing lighted warnings to approaching vehicles, or could change module color and flash amber or red to advise vehicles in the immediate vicinity of hazardous road surface conditions. Alternative future developed energy sources such as wireless energy transmission are contemplated for use in the invention.

An integrated light guide is fully molded into the underside of top surface of the enclosure. The light guide provides focused light such that the light output is directed to the immediate lane user, providing clarity on lane location. Further, as current LED lighted modules tend to output normal LED light streams, and result in excessive glare, the light guide distributes the light over the full output surface, providing clarity of the module without significant glare, a particular issue that has become more prevalent with an aging driver population.

Future embodiments may use a Fresnel lens molded into the top surface to improve light distribution and focus, resulting in improved lane control and driver clarity without significant glare.

Future embodiments may also use an extended light guide to provide for extended lighted lengths of the module, allowing for fully lighted lane striping in areas such as heavily built up urban areas where extraneous lights and structures detract from the road environment, add to driver confusion, and where greatly enhanced line striping will provide improved driver guidance.

Energy management is critical to keeping LEDs lighted and protect batteries while dealing with overcast or winter conditions, as well as temperature extremes. While similar systems incorporate energy management systems, the energy management system incorporates functions to protect batteries, specifically turning them off when voltage is too low if there is insufficient sun to recharge and secondly, turning the unit off if environmental temperatures exceed the battery manufacturers recommended operating performance curve, high or low.

One embodiment of the energy management system includes a vibration sensor with multiple advantages; first, to provide supplemental or primary energy collection to replenish the energy storage systems; second to determine when traffic is approaching on low volume roads and facilities, and only then to turn on the LEDs for sufficient time for the approaching traffic to see and pass by; said system may be used on barriers, crosswalks, signage in urban areas, bridges, parking lots, airfields, overhead lighting in urban areas, fire hydrant markers, and similar road and highway facilities.

Due to traffic abrasion from environmental contaminants such as dust and winter sanding materials, standard modules lose significant effectiveness as the surface of the lens and solar covers become rough and clarity is reduced, thus reducing light output and solar collection ability. A proprietary non-stick polymer or other material coating or surface treatment is applied to the external surfaces of the module upon completion of assembly to significantly reduce surface contamination, improve wear and light transmission, and extend life of the enclosure and resultant effectiveness of the module. Materials hereinafter discovered and/or developed that are determined to be suitable for use in pavement marker module devices would also be considered suitable for use in a pavement marker module according to a particular embodiment, including but not limited to polymers, glass, glass fibers, metal, or ceramics.

In a further embodiment what is disclosed is a system and method of providing enhanced traffic signaling in response a traffic condition. The method includes the step of the step of providing at least one road module. The road module has a light configured for illumination, de-illumination, and/or flashing. The road module is embedded in or affixed to the surface of a road.

The method involves the step of providing a sensor and the step of providing a processor. The sensor is in communication with the processor. The sensor and/or processor could be placed exterior to the road module; however in a preferred embodiment the sensor and processor integral in or on the road module.

The light of the road module is configured to illuminate and/or flash in said response to a communication from the processor. The road module and/or sensor are positioned proximate to a fire hydrant, a bus stop, an intersection with a bicycle and/or pedestrian path intersecting with said road in which the road module is embedded. The sensor is configured for detection of at least one traffic condition and/or road surface condition including a condition selected from the group consisting of an EMS vehicle located in proximity to a fire hydrant, a vehicle located in proximity to a bus stop, a vehicle located in proximity to an intersection with a bicycle and/or pedestrian path intersecting with the road in which the road module is embedded.

The processor is configured to illuminate and/or flash the light of the road module in response to the sensor sensing said traffic condition and/or road surface condition comprising a condition selected from the group consisting of an EMS vehicle located in proximity to a fire hydrant, a vehicle located in proximity to a bus stop, a vehicle located in proximity to an intersection with a bicycle and/or pedestrian path intersecting with said road in which said road modules and/or one or more light strips are embedded.

The method includes the step of sensing via said sensor the traffic condition and/or road surface condition comprising a condition selected from the group consisting of an EMS vehicle located in proximity to a fire hydrant, a vehicle located in proximity to a bus stop, a vehicle located in proximity to an intersection with a bicycle and/or pedestrian path intersecting with the road in which the road module is embedded. The processor then coordinates either in the same step or as a separate step the illumination, de-illumination, and/or flashing of said road module in response to the occurrence of the traffic condition and/or road surface condition comprising a condition selected from the group consisting of an EMS vehicle located in proximity to a fire hydrant, a vehicle located in proximity to a bus stop, a vehicle located in proximity to an intersection with a bicycle and/or pedestrian path intersecting with said road in which said road modules and/or one or more light strips are embedded.

Additional understanding of the devices contemplated and/or claimed by the inventor can be gained by reviewing the detailed description of exemplary devices, presented below, and the referenced drawings.

BRIEF DESCRIPTION OF THE DRAWINGS

FIG. 1 is a top plan view of a first exemplary pavement marker module.

FIG. 2 is a cross-sectional view of the first exemplary pavement marker module of FIG. 1, taken along line 2-2.

FIG. 3 is a cross-sectional view of the first exemplary pavement marker module of FIG. 1, taken along line 3-3.

FIG. 4 is a cross-sectional view of the first exemplary pavement marker module of FIG. 1, taken along line 4-4.

FIG. 5 is a cross-sectional view of the first exemplary pavement marker module of FIG. 1, taken along line 5-5.

FIG. 8 is a first environmental view of an exemplary pavement marker module installed on a pavement surface.

FIG. 9 is a second environmental view of an exemplary pavement marker module installed in a groove in a pavement surface.

FIGS. 28-31 illustrate flow diagrams of an embodiment of a traffic control system in which the system directs a platoon of autonomous or semi-autonomous platooning vehicles based on signals regarding traffic and/or environmental conditions generated by sensors located in road modules and/or one or more light strips.

FIG. 29 illustrates a flow diagram of an embodiment of a traffic control system in which the system directs a platoon of autonomous or semi-autonomous platooning vehicles in coordination with independent vehicles traveling on the same road based on signals based on traffic and/or environmental conditions generated by sensors located in road modules and/or one or more light strips.

FIG. 30 illustrates a road incorporating a traffic control system according to the flow diagram of FIGS. 28 and 29.

FIG. 31 illustrates a flow diagram of a traffic control system.

DEFINITIONS

Figure 6:
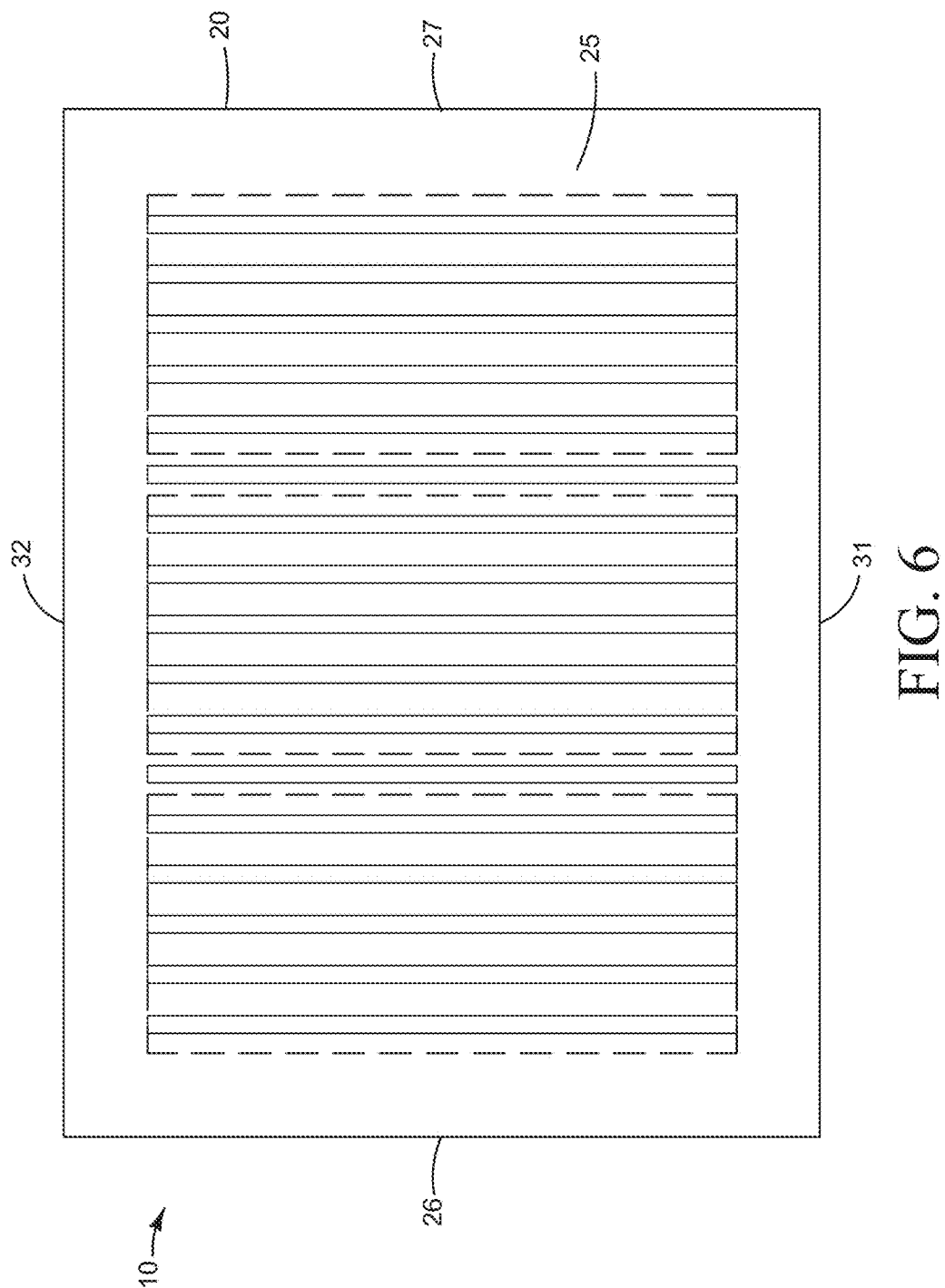
FIG. 6 is a bottom plan view of the first exemplary pavement marker module of FIG. 1.
Figure 7:
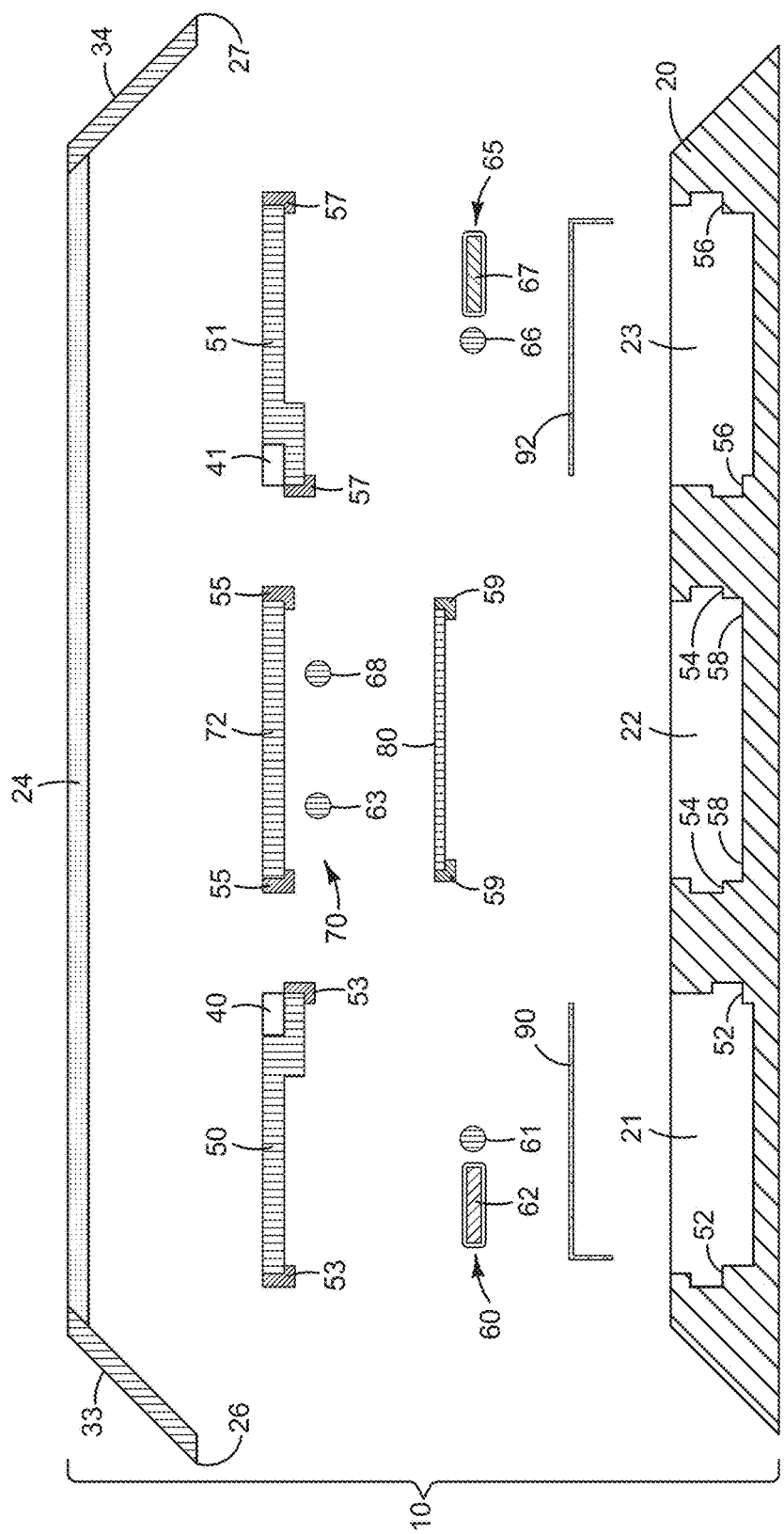
FIG. 7 is an exploded view of the cross-sectional view of FIG. 2.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise.

The use of the articles "a," "an" and "the" are meant to be interpreted as referring to the singular as well as the plural, unless the context clearly dictates otherwise. Thus, for example, reference to "a light-emitting diode" includes two or more such light-emitting diodes, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The drawings illustrate a first exemplary pavement marker module which incorporates components which alone or in combination make up various other exemplary pavement marker modules. The specification describes a number of different exemplary pavement marker modules, including the first exemplary pavement marker module. These exemplary pavement marker modules may include some, most, or all of the components illustrated with respect to the first exemplary pavement marker module, and the mere inclusion of a component within the first exemplary pavement marker module is not intended to expressly or implicitly imply that every exemplary pavement marker module will include such a component.

The first exemplary pavement marker module 10 is illustrated in FIGS. 1 through 9. The pavement marker module 10 comprising a housing 20, a light source 40, a light guide 50, an energy storage system 60, and a charging system 70. Optionally, one or more of a second light source 41, a second light guide 51, and a second energy storage system 65 could be provided.

Preferably, the housing 20 is designed using materials that will withstand up to twenty tons of pressure, and is designed to be fully enclosed and weather resistant. The exposed surfaces of the housing 20 can be coated with a proprietary non-stick polymer coating to minimize contamination of the top lens covering to maintain maximum light transmission, both for energy collection and light dissemination, and to minimize abrasion of the unit.

The housing 20 has a top side 28 spaced apart from a bottom side 25, a first end 26 spaced apart from a second end 27, and a first side 31 spaced apart from a second side 32.

One example of a potential size of a housing is 0.75-inches thick, four-inches wide, and eight-inches long. A skilled artisan will be able to select an appropriate size, structure and material for the housing in a particular embodiment based on various considerations, including the intended use of the pavement marker module, the intended arena within which the pavement marker module will be used, specific energy requirements of a specific use, and the equipment and/or accessories with which the pavement marker module is intended to be used, among other considerations. For instance, the housing 20 could comprise a polycarbonate material. Materials hereinafter discovered and/or developed that are determined to be suitable for use in pavement marker module devices would also be considered suitable for use in a pavement marker module according to a particular embodiment, including but not limited to polymers, glass, glass fibers, metal, or ceramics.

Preferably, adjacent the first end 26 is a reflective portion 33, and/or adjacent the second end 27 is a reflective portion 34. By being located on the first end 26 and/or the second end 27 of the housing 20, the reflective portions 33, 34 are configured for facing oncoming traffic. Preferably, the reflective portions 33, 34 are configured at an angle such that the reflective portions 33, 34 catches and reflects light emitted from an oncoming vehicle back towards the oncoming vehicle. In such a configuration, oncoming vehicles are able to observe both the reflection from their own headlights (off reflective portions 33, 34), and light emanating from light source 40 of the pavement marker module 10. The reflective portions work even when the light source 40 of the pavement marker module 10 is not emitting light. It is preferred that the reflective portions provide minimum daylight reflectance within ten points of AASHTO or state departments of transportation requirements.

The pavement marker module 10 is configured for attachment to a mount surface. A first example of a mount surface is a pavement surface 5, as illustrated in FIG. 8, upon which the pavement marker module 10 is placed. A second example of a mount surface is a channel surface 4 of a channel 2 defined in a pavement surface 5, as illustrated in FIG. 9. Such a channel 2 could be generally 0.75 inches deep, and thirty-inches long. In such a configuration, the top side 28 of the pavement marker module 10 is preferably slightly recessed below the pavement surface 5, but could be generally co-planar with the pavement surface 5, being anywhere from raised above, to flush with, to recessed below.

The attachment to the mount surface can be done through any common methods/apparatuses, a skilled artisan will be able to select an appropriate structure and material for the attachment in a particular embodiment based on various considerations, including the intended use of the pavement marker module, the intended arena within which the pavement marker module will be used, and the equipment and/or accessories with which the pavement marker module is intended to be used, among other considerations. For instance, the bottom side 25 of the housing 20 could be fastened to the mount surface via a mechanical fastener, such as a screw. For instance, the bottom side 25 of the housing 20 could be fastened to the mount surface via an adhesive attachment. In one example of an adhesive attachment, a first side of double sided adhesive tape is applied to at least a portion of the bottom side 25 of the housing 20, and the housing 20 is pressed against the mount surface so that the second side of the double sided adhesive tape adheres to the mount surface.

Another example of a mechanical fastener comprises at least one connector portion defined in the housing, for instance on or adjacent the bottom side of the housing. The connector portion could be configured for engagement with a mating connector(s) on a base portion. The base portion can be attached to the pavement surface (or within a channel within the pavement surface), through a mechanical fastener, adhesive or other mechanism, and the connector portion of the housing can then be connected to the base portion, for instance through slideable engagement. An adhesive could further be used to lock the connector portion and the base portion together.

In an exemplary pavement marker module, the housing defines at least one cavity for receiving components. In the first exemplary pavement marker module 10, the housing 20 defines a first cavity 21, a second cavity 22, and a third cavity 23. The top side 28 defining at least one cavity opening therethrough for providing access to said cavity or cavities. In other exemplary pavement marker modules, all of the components could be located within the same cavity, or in multiple cavities.

Preferably, the components within each cavity are protected by at least one shock pad, such as a silicone shock pad. The shock pads further protect the components of the pavement marker module from high impact forces applied to the housing.

The first cavity 21 comprises a light guide 50 and an energy storage system 60. The light guide 50 mounted within the first cavity 21. The light guide 50 is optically coupled to a light source 40. The light guide 50 is configured for deflecting or otherwise scattering light emitted by the light source 40 at a predetermined angle or range of angles therefrom in a desired direction, causing light emitted therefrom to exit the light guide 50, be transmitted through the cover 12, and away from the pavement marker module 10. For instance, in an outward direction at a fixed angle $\Theta$, as illustrated in FIGS. 8 and 9. It is preferred that the light guide 50 diffuses light so it is evenly spread along a lighted surface.

The light guide 50 is further configured such that it may be elongated. Additionally, the light guide 50 can be coupled with additional light guides 50' and even more elongated lighted surface. Such a feature is particularly advantageous in locations where it is difficult to delineate various roadway segments.

The light source 40 is electrically connected to the energy storage system 60, for instance through electrical wiring. The first cavity 21 may include one or more ports defined therethrough for allowing the components in the first cavity 21 to be connected with components in other cavities. The first cavity 21 further comprising at least one ledge 52. The light guide 50 and/or the light source 40 connecting with the first cavity 21 at the ledge 52, preferably resting upon at least one shock pad 53 configured for absorbing shock and protecting the components from damage.

The light source 40 can be any desired color, and a skilled artisan will be able to select an appropriate light source and color(s) of light in a particular embodiment based on various considerations, including the intended use of the pavement marker module, the intended arena within which the pavement marker module will be used, and the equipment and/or accessories with which the pavement marker module is intended to be used, among other considerations. For instance, the light source 40 could be white and/or yellow light-emitting diodes and the light source 42 could be red light-emitting diodes so that traffic in a first direction would see white or yellow light, whereas traffic in a second (incorrect) direction would see red light. In another example, the light source(s) could be tri-color light-emitting diodes with red, green and blue emitters allowing the color light emitted to be varied as desired. In another example, the light source(s) could be blue light-emitting diodes for emitting blue light.

The energy storage system 60 provides electrical power to the light source 40, and is electrically connected to a charging system 70 for permitting the energy storage system 60 to be recharged.

Preferably, the energy storage system 60 is a direct current (DC) system. Benefits of a direct current system include that the preferred light source (light-emitting diodes) and other system components are configured for using direct current; a direct current system is low-voltage; and a direct current system is easy to install and maintain.

An exemplary energy storage system may include one or more energy storage devices (e.g., a battery, an ultracapacitor), one or more vibration energy harvesting devices, or a combination thereof. The energy storage devices utilized by an energy storage system 60 can be independent from one another, or can be connected together (e.g., in series, in parallel). The energy storage system 60 illustrated in the figures includes an ultracapacitor 61, a battery 62, and a vibration energy harvesting device 63.

The second cavity 22 comprises at least one control system 80 and at least one solar module 72. The control system 80 may mount within the second cavity 22 upon one or more ledges 58. Preferably such a mount includes one or more shock pads 59.

The control system 80 controls the operation of one or more components of the pavement marker module 10. In some exemplary pavement marker modules, the control system could include a central processing unit. In other exemplary pavement marker modules, the control system could be a simple circuit for receiving electrical inputs and providing an electrical output according to the inputs. An exemplary control system may comprise computer logic, memory, timers, sensors, transmitters, receivers, and/or data recording and/or output means.

An exemplary control system may include a process and method for optimizing a particular performance objective by: measuring various energy storage parameters, making decisions based on these parameters, and commanding or halting the transfer of electrical energy accordingly. An exemplary control system may further controls the energy flow from the energy producing system to the energy storage system and how it is delivered to the electrical circuit load.

An exemplary control system 80 may include one or more controllers for managing charging of the energy storage system 65 and delivery of energy to the electrical circuit load. Control of the operative connection between the energy storage system 65, the control system 80, and the electrical circuit load may be done by electronics, circuitry, and/or semiconductors. The controller(s) preferably continually monitor system performance (amount of energy produced, amount of energy consumed—both daily and weekly) to proactively manage how energy is stored and delivered to the electrical circuit load. For example, if there are several days of lower than usual energy production from the charging system 70 (several cloudy days), the control system 80 could restrict the delivery of power to the electrical circuit load in order to conserve energy until the sun comes out again. The controller(s) preferably control the speed and the amount that the energy storage system 65 components, particularly the batteries, are charged and discharged, which can significantly affect life.

A controller could deliver a low-current (trickle) charge from the charging system 70 to the energy storage system 65. Such a controller could also limit the maximum voltage to a voltage that will not damage or degrade the components of the energy storage system 65. A controller could draw current from the energy storage system 65 and deliver it to the electrical circuit load. The minimum battery voltage is also protected by the controller to prevent excessive battery drain. During prolonged periods of inclement weather and low daytime energy generation, the controller could dim the lights during part or all of the night to reduce the amount of energy being consumed while still providing some functionality. For example, a controller could turn the light source ON based on a signal from a sensor, and OFF with a time clock. For example, a controller could turn the light source ON and OFF based on one or more signals from a sensor (e.g., photodetector).

The system may be controlled according to a chart, table, instructions or other data that defines light levels for various times of the night for example, providing brighter light during the first few hours, then dimming down for one or several time periods. For instance, two hours at a first lighting level, followed by one hour at a second lighting level, one hour at a third level, three hours at a fourth level, then back to the first level for the remaining hour(s) of the night. Lighting levels can also be adjusted as required to accommodate changes in the weather, thereby, for instance, proactively conserving energy after the first cloudy day.

The control system 80 may comprise only electronics and apparatus to operate the single pavement marker module, or may additionally comprise electronics and apparatus that communicate with a central control station and/or with other pavement marker modules. Such communication could be accomplished via wired communication, wirelessly, or by a combination thereto. For example, by means of a "multiple-node" or "mesh" network (e.g., ZigBee, Z-Wave) and/or other wireless systems such as WiFi, cell-phone radio and/or satellite communication. Such a network of multiple pavement marker modules and a central control station may allow monitoring, and/or control of, the performance of individual pavement marker modules and groups of pavement marker modules. Such performance monitoring and/or control may enhance public safety and improve maintenance and reduce the cost of said maintenance. A central control station may take the form of, or be supplemented by, a server accessible via an internet website, for example.

The control system 80 is configured for managing the operation of the first exemplary pavement marker module's electronics. This electrical management is conducted through electrical connections. The control system 80 is electrically connected to the energy storage system 60, the solar module 72, the first light source 40, and/or the second light source 42, for instance through electrical wiring. The second cavity 22 may include one or more ports defined therethrough for allowing the components in the second cavity 22 to be connected with components in other cavities. The second cavity 22 further comprising at least one ledge 54. The solar module 72 and/or control system 80 may be connected with the second cavity 22 at the ledge 54, preferably resting upon at least one shock pad 55 configured for absorbing shock and protecting the components from damage.

In this exemplary pavement marker module 10, the third cavity 23 comprises a light guide 51 and an energy storage system 65. The light guide 51 mounted within the third cavity 23. The light guide 51 is optically coupled to a second light source 42. The light guide 51 is configured for deflecting, diffusing or otherwise scattering light emitted by the light source 42 at a predetermined angle or range of angles therefrom in a desired direction, causing light emitted therefrom to exit the light guide 51, be transmitted through the cover 12, and away from the pavement marker module 10.

The light source 42 is electrically connected to the energy storage system 65, for instance through electrical wiring. The third cavity 23 may include one or more ports defined therethrough for allowing the components in the third cavity 23 to be connected with components in other cavities. The third cavity 23 further comprising at least one ledge 56. The light guide 51 and/or the light source 42 connecting with the third cavity 23 at the ledge 56, preferably resting upon at least one shock pad 57 configured for absorbing shock and protecting the components from damage.

The energy storage system 65 provides electrical power to the light source 40, and is electrically connected to a charging system 70 for permitting the energy storage system 65 to be recharged. The energy storage system 65 may comprise one or more of an ultracapacitor 66, a battery 67, or a vibration energy harvesting device 68.

The preferred energy storage device is an ultracapacitor. Where batteries are used in an exemplary energy storage system, preferred batteries include, but are not limited to lithium iron phosphate batteries, sealed lead-acid AGM-type batteries, gel-cell batteries, nickel-metal hydride batteries, and lithium batteries. It is desirable to maintain the batteries within a moderate temperature range, for example, 40 to 90 degrees F. as exposure of the batteries to temperatures outside that range will tend to degrade battery performance and life. Daily battery performance may be reduced by more than fifty percent (50%) by temperature extremes, and batteries may stop working entirely in very low temperatures. Further, high temperatures tend to also degrade battery performance and life. In the preferred configuration, the batteries are surrounded on multiple sides by insulation for protecting the batteries from temperature extremes. The insulation for helping keep the temperature of the batteries above about 40 degrees F. in the winter, and below about 90 degrees F. in the summer.

By using larger and/or more numerous solar modules, it is preferred that the charging system generate excess energy (beyond what the pavement marker module will utilize in a given day), and that that excess energy will be stored within the energy storage system. By doing so, even on a cloudy day the solar modules will generate enough electrical current (stored in the energy storage system) to provide a complete and full charge for use by the system that night. Further, the utilization of at least one vibration energy harvesting device is beneficial for supplementing the energy generation by the solar module, particularly on cloudy days when the solar module's power output may be decreased. These methods greatly reduce and potentially eliminate entirely the need to conserve the energy output as described in the control system.

The vibration energy harvesting device can convert otherwise wasted energy from mechanical vibrations induced into the pavement by traffic into useable electrical energy. A vibration energy harvesting device not only provides "back-up" power for the charging system, it also is capable of producing energy at night when the solar module of the charging system is not producing electrical current. Additionally, if there are higher energy demands at night, for instance when there is a lot of traffic, the amount of energy produced by the vibration energy harvesting device would increase commensurate with the increase in traffic.

The energy storage system 60 is configured to store the energy provided by the solar module 72 during the day or previous days, and powers the pavement marker module 10 during the night. The energy storage system 60 is adapted to store enough energy to power, when fully charged, the electrical circuit load for several nights with little or no additional charging and without any outside energy input. The energy storage system 60 preferably stores enough energy to power the electrical circuit load for at least five nights and, more preferably, five to nine nights equating to about fifty to one-hundred hours or more depending upon the number of hours in a night. Thus, the pavement marker module 10 is capable of autonomously powering (that is, with only the energy stored by the energy storages system 60 and provided by the charging system 70) the pavement marker module 10 for several, and preferably at least five nights, even when it is located in an overcast, inclement, hazy or smoggy location, all of which conditions will diminish the intensity of the daytime sun. The large amount of energy stored in the energy storage system 60 during days of clearer weather is sufficient to "carry it through" cloudy and inclement weather for about a week, until improved sunlight conditions return.

The cavities of an exemplary housing are covered with at least one translucent protective cover. In the first exemplary pavement marker module 10 illustrated in this Figure, the first cavity 21, the second cavity 22, and the third cavity 23 are jointly covered by protective cover 24. In other exemplary pavement marker modules, each cavity may have its own cover. It is preferred that the protective cover(s) seal the cavity/cavities from the environment. The protective cover 24 comprises any suitable material, including but not limited to high strength glass, plastics, including thermoplastic polymers such as clear polycarbonates, and other translucent polymers. Preferably, the protective cover 24 is resistant to ultraviolet light deterioration, is capable of maintain light transmission, and is of sufficient strength to withstand traffic and equipment impacts, and to withstand abrasion from environmental dust and materials, including that introduced by abrasives applied for winter traction.

Optionally, the polycarbonate cover can be coated with a non-stick polymer coating to protect the cover, to maintain maximum light transmission (for both energy collection and light dissemination), and to minimize abrasion and subsequent degradation of the unit cover.

The cover 24 is preferably bonded to the housing 20 utilizing an adhesive such that the housing 20 and the cover 24 are able to expand and contact with variant environmental conditions. Preferably, such a bond results in a waterproof seal for the cavity and the components located therein. A skilled artisan will be able to select an appropriate structure and material for the cover in a particular embodiment based on various considerations, including the intended use of the pavement marker module, the intended arena within which the pavement marker module will be used, and the equipment and/or accessories with which the pavement marker module is intended to be used, among other considerations. For instance, the cover 24 could comprise a polycarbonate material. Materials hereinafter discovered and/or developed that are determined to be suitable for use in pavement marker module devices would also be considered suitable for use in a pavement marker module according to a particular embodiment.

Within at least one of the cavities is a light guide 50. The light guide 50 is reflective in nature and directs light omitted from a light source 40 in a desired direction, such as in an outward direction at a desired angle $\Theta$. Angle $\Theta$, can be any angle or range of angles. Preferably, the light guide 50 reflects light at an angle $\Theta$ of generally twenty-five degrees (25°) vertically from the pavement surface 5, towards oncoming traffic. The light guide 50 is preferably designed to provide even diffusion of lighting to avoid glare while clearly delineating the line represented by the markers in the intended viewing direction. The light guide 50 is preferably designed to provide a minimum of twenty degrees to a maximum of seventy degrees horizontal light spread left and right from centerline in the intended lighting direction. The light guide 50 is preferably designed to provide a minimum of zero degrees to a maximum of ninety degrees vertical light spread up from the surface in the intended lighting direction. The light guide 50 is preferably designed to eliminate perceptible light backscatter in the opposite direction from the intended viewing angles. The lighted area is designed to be extended to variable lengths up to one-hundred feet in length, providing a continuously lighted highway stripe.

The light source 40 generates visible light for the pavement marker module 10. The preferred light source 40 comprises one or more electroluminescent lamps (e.g., light-emitting diodes, electroluminescent wires). The light source 40 can include one or more lights providing the specific colors required by the national Manual on Uniform Traffic Control Devices, and may be revised to provide any color required by the specific application.

Components of exemplary pavement marker modules, particularly the light source 40, may be powered ON and OFF by a sensor, by remote wired devices, and/or by remote wireless devices, such as wireless power transmission technology including wireless resonance technology. Further, the components of exemplary pavement marker modules can work in conjunction with lighted marker posts along the roadway, as well as lighting systems that provide lighting on the roadway.

The light source 40 may be operated as a solid light source. The light source 40 may be operated at a single lighting level, or at variable lighting intensity levels. The light source 40 may be operated in a rapid flash mode wherein the flash is not detectable to the human eye rather appears to be a solid light source. The light source 40 may be operated in an emergency flash mode.

The light source 40 is powered by a power source. Examples of power sources include, but are not limited to alternating current sources (e.g., a connection to the power grid), and an energy storage system 60.

The energy storage system 60 can comprise batteries, rechargeable batteries, capacitors, advanced capacitors, supercapacitors, ultracapacitors, fuel cells, and combinations thereof. The energy storage system 60 stores electrical energy for powering the electrical components of the pavement marker module 10, for instance, powering the light source 40 of the pavement marker module 10. The energy storage system 60 can be configured for recharging through use of a charging system 70. Elements of the charging system 70 may comprise the control system 80.

The charging system 70 is for the charging and/or discharging of the energy storage system 60. An exemplary charging system one or more solar modules, vibration energy harvesting devices, and combinations thereof. Further, the charging system could comprise a hard wire connection into power supply, such as a twelve-volt (12V) low power supply. The charging system 70 illustrated in the Figures includes a solar module 72 for generating electrical current utilized to recharge the energy storage system 60 and/or power the electrical components of the pavement marker module 10 directly, including the light source 40.

Referring to FIG. 6, to dissipate the heat generated by the light sources 40, 42, the first cavity 21 may comprise a heatsink 90, and/or the third cavity 23 may comprise a heatsink 92. Such a heatsinks 90, 92 are preferably perpendicular to the length of the housing 20. Such heatsinks 90, 92 can be configured to contact one or more of the internal components inside the housing 20. Such heatsinks 90, 92 can extend through the bottom side 25 of the housing and provide the sink to the earth through the pavement, as illustrated in FIG. 2. Additionally, such heatsinks 90, 92 could extend outside of the cavity in question to an external heatsink portion 94, thereby providing a sink to the atmosphere. Dissipating such excess heat is useful to extend the life of the electrical components of the pavement marker module 10. Such heatsinks may further comprise ribs, dimples, or surface undulations to maximize wetted surface and heat dissipation.

Again, the drawings illustrate a first exemplary pavement marker module which incorporates components which alone or in combination make up various other exemplary pavement marker modules. The specification describes a number of different exemplary pavement marker modules, including the first exemplary pavement marker module. These exemplary pavement marker modules may include some, most, or all of the components illustrated with respect to the first exemplary pavement marker module, and the mere inclusion of a component within the first exemplary pavement marker module is not intended to expressly or implicitly imply that every exemplary pavement marker module will include such a component.

A second exemplary pavement marker module comprises the following components described in detail above with respect to the first exemplary pavement marker module which illustrated in the Figures and described above. The second exemplary pavement marker module comprising a housing, reflector, surface mount, three defined cavities, a piezoelectric vibration energy harvesting device, and at least one light-emitting diode.

The housing of the second exemplary pavement marker comprises a bottom side, first end, second end, top side, first side, and second side. The housing is generally trapezoidal in shape and protects the components held therein. A skilled artisan will be able to select an appropriate structure and material for the housing based on various considerations, including the intended use of the pavement marker module, the intended arena within which the pavement marker will be used, and the equipment and/or accessories with which the pavement marker module is intended to be used, among other considerations.

The first and second ends of the housing of the second exemplary pavement marker comprise reflective portions, configured for facing oncoming traffic. The reflective portions are angled such that light is captured from oncoming vehicles and reflected back towards the vehicle. Such a configuration allows the vehicles to observe both the reflection from their own headlights and the light emanating from the second exemplary pavement marker.

The housing of the second exemplary pavement marker is configured for attachment to a pavement surface by a mechanical fastener, such as an adhesive. An adhesive, such as double-sided tape, is applied to the bottom side of the housing and pressed against the pavement surface. Such a configuration allows for convenient, yet semi-permanent application.

Within the housing of the second exemplary pavement marker are three separate, fully-defined cavities. Each of the cavities are configured for receiving components therein and are protected by at least one shock pad. The first cavity of the second exemplary pavement marker comprises a light guide coupled to a light source and energy storage system. The light guide deflects light from the light source—a light-emitting diode—in an outward direction. Further, the light source is electronically connected to the energy storage system, by electrical wiring, which provides stored power.

The power stored by the energy storage system is created by a piezoelectric vibration energy harvesting device. Such a device converts otherwise wasted energy into usable electric energy. The vibration energy harvesting device comprises a piezoelectric material having the ability to develop an electric charge on its surface as a result of mechanical stress exerted upon or near it. In this exemplary embodiment, the mechanical stress is that of vibrations caused by roadway activity. When vehicles pass by the piezoelectric material captures the vibrations, thus generating an electrical charge. This charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

The second cavity of the second exemplary pavement marker comprises at least one control system and at least one solar module. The at least one controller controls the speed and amount that the energy storage system is charged and discharged. The control system operates through electrical wiring connections and one or more ports defined through the second cavity. Electrical wiring connections exist between the control system, solar module, light source, and energy storage system.

In addition to being connected to the energy storage system and vibration energy harvesting device, the light source is electrically connected to at least one solar module. The solar module converts ordinary light to electricity and provides the electricity to the light source as its primary source of power. Only when light is absent does the light source use power provided by energy storage system and the vibration energy harvesting device.

Finally, the third cavity of the second exemplary pavement marker comprises an additional light guide coupled to a light source. Like in the first cavity, the light guide deflects light from the light source—one or more light-emitting diodes—in an outward direction. These components, too, are electronically connected to the energy storage system, control system, and solar module by electrical wiring.

A third exemplary pavement marker module comprises the following components described in detail above with respect to the second exemplary pavement marker module and described above. The third exemplary pavement marker module comprising a housing, reflector, surface mount, one defined cavity, a piezoelectric vibration energy harvesting device, and at least one light-emitting diode.

Like the second exemplary pavement marker module, the third exemplary pavement marker module comprises a housing having a bottom side, first end, second end, top side, first side, and second side. The housing is generally trapezoidal in shape and protects the components held therein.

Inside the housing of the third exemplary pavement marker module is a single cavity configured for receiving components therein and is protected by at least one shock pad. Inside the single cavity is at least one light guide coupled to at least one light-emitting diode, a piezoelectric vibration energy harvesting device, at least one control system, and at least one control board. The components are electrically connected through the use of electrical wiring.

A fourth exemplary pavement marker module comprises the following components described in detail above with respect to the second exemplary pavement marker module which is described above. The fourth exemplary pavement marker module comprising a housing, reflector, surface mount, three defined cavities, a piezoelectric vibration energy harvesting device, and at least one light-emitting diode.

Like the second exemplary pavement marker module, the fourth exemplary pavement marker module comprises a housing having a bottom side, first end, second end, top side, first side, and second side. The housing is generally trapezoidal in shape and protects the components held therein.

The housing of the fourth exemplary pavement marker is configured for attachment within a roadway channel. The channel is cut into a pavement surface and has dimensions slightly larger than the housing of the fourth exemplary pavement marker. An adhesive, such as double-sided tape, is applied to the bottom side of the housing and pressed against the surface within the channel. This allows the pavement marker to rest slightly below the pavement surface, providing it with extra protection. Such a configuration allows for convenient, yet semi-permanent application.

A fifth exemplary pavement marker module comprises the following components described in detail above with respect to the second exemplary pavement marker module which is described above. The fifth exemplary pavement marker module comprising a housing, reflector, surface mount, three defined cavities, a electrostatic vibration energy harvesting device, and at least one light-emitting diode.

Like the second exemplary pavement marker module, the housing of the fifth exemplary pavement marker comprises a bottom side, first end, second end, top side, first side, and second side. The housing is generally trapezoidal in shape and protects the components held therein.

Inside the first cavity of the fifth exemplary pavement marker is at least one light guide coupled to a light source and energy storage system. The power stored by the energy storage system is created using an electrostatic vibration energy harvesting device. Such an electrostatic vibration energy harvesting device converts otherwise wasted energy into usable electric energy. The electrostatic vibration energy harvesting device comprises a variable capacitor to generate charges based on motion between two plates. The mechanical movement between the two plates alters capacitance, thus generating an electrical charge. In this exemplary embodiment, motion between the two plates is caused by vibrations resulting from roadway activity. When vehicles pass by the positions of the plates change, thus altering capacitance and creating an electrical charge. This charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

A sixth exemplary pavement marker module comprises the following components described in detail above with respect to the second exemplary pavement marker module which is described above. The sixth exemplary pavement marker module comprising a housing, reflector, surface mount, three defined cavities, a electrostatic vibration energy harvesting device, and at least one light-emitting diode.

Like the second exemplary pavement marker module, the housing of the sixth exemplary pavement marker comprises a bottom side, first end, second end, top side, first side, and second side. The housing is generally trapezoidal in shape and protects the components held therein.

Inside the first cavity of the sixth exemplary pavement marker is at least one light guide coupled to a light source and energy storage system. The power stored by the energy storage system is created using an electromagnetic vibration energy harvesting device. Such an electromagnetic vibration energy harvesting device converts otherwise wasted energy into usable electric energy. The electromagnetic energy harvesting device comprises a coil and magnet. The mechanical movement of the magnet relative to the coil creates an electromotive force which, through the presence of electrical circuitry, is converted into an electrical charge. In this exemplary embodiment, movement of the magnet relative to the coil is caused by vibrations resulting from roadway activity. When vehicles pass by the position of the magnet, relative to the coil, changes, thus creating an electromotive force. This force, through the presence of electrical circuitry, is then converted into an electrical charge. The charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

A seventh exemplary pavement marker module comprises the following components described in detail above with respect to the second exemplary pavement marker module which is described above. The seventh exemplary pavement marker module comprising a housing, reflector, surface mount, three defined cavities, and at least one light-emitting diode. Like the second exemplary pavement marker module, the seventh exemplary pavement marker module comprises a housing having a bottom side, first end, second end, top side, first side, and second side. The housing is generally trapezoidal in shape and protects the components held therein. Within the housing of the second exemplary pavement marker are three separate, fully-defined cavities. Each of the cavities are configured for receiving components therein and are protected by at least one shock pad. The first cavity of the second exemplary pavement marker comprises a light guide coupled to a light source and energy storage system. The light guide deflects light from the light source—a light-emitting diode—in an outward direction. Further, the light source is electronically connected to the energy storage system, by electrical wiring, which provides stored power.

The power stored by the energy storage system is created by at least one rechargeable battery. In addition to being electronically connected to the light source, the energy storage system is electrically connected to the pavement marker's solar module. The solar module converts ordinary light to electricity and provides the electricity to both the energy storage system and light module. When light is present, the light module uses the direct electricity generated by the solar module. However, when light is absent, the stored energy becomes the light source's primary source of power.

An eighth exemplary pavement marker module comprises the following components described in detail above with respect to the second exemplary pavement marker module which is described above. The eighth exemplary pavement marker module comprising a housing, a reflector, a surface mount, at least one defined cavity, and at least one light-emitting diode.

Like the second exemplary pavement marker module, the eighth exemplary pavement marker module comprises a housing having a bottom side, first end, second end, top side, first side, and second side. The housing is generally trapezoidal in shape and protects the components held therein. Inside the housing of the eighth exemplary pavement marker module is at least one cavity configured for receiving components therein and is protected by at least one shock pad. Further, the at least one cavity comprises multiple light modules, spaced apart and aligned along a common longitudinal plane. In addition to the multiple light modules, the at least one cavity further comprises at least one solar module also aligned along the common longitudinal plane. The components are electrically connected through the use of electrical wiring such that the at least one solar module converts common light into electricity, thus powering the multiple light modules.

A ninth exemplary pavement marker module comprises the following components described in detail above with respect to the first exemplary pavement marker module which is described above. The ninth exemplary pavement parker module comprising a housing, at least one solar module, a power storage device, a lighting module, an angled lens, and at least one reflector.

The housing of the ninth exemplary pavement marker comprises a flat upper surface, further comprising a cover equipped with at least one angular reflector lens. Additionally, the housing further comprises at least one additional reflector for reflecting light emitted by an automobile back towards the same automobile. Inside the housing is at least one solar module electrically connected to a power storage device. The solar module is configured such that it converts ordinary light into electricity, which is stored by the power storage device.

The power storage device is further electrically connected to the light module of the ninth exemplary pavement marker. Upon receiving stored electricity from the solar module, the power storage unit sends electricity to the light module, thus illuminating at least one light-emitting diode. Further, the housing's angular reflector lens refracts light from the light-emitting diode in a first direction, towards oncoming traffic, preferably, at an angle of 25 degrees vertically from the pavement's surface. This angle allows optimal viewing of the light-emitting diode by oncoming vehicles.

Further, it is preferable that the power storage device is comprised of at least one ultracapacitor, battery, capacitor, or combination thereof. Such a storage device, or combination thereof, enables the tenth exemplary pavement marker to efficiently store electricity for later use.

A tenth exemplary pavement marker module comprises the following components described in detail above with respect to the ninth exemplary pavement marker module which is described above. The tenth exemplary pavement parker module comprising a housing having a first end opposite a second end, the housing having multiple light modules.

The housing of the tenth exemplary pavement marker module further comprises a first end opposite a second end. Additionally, at least one of the ends comprises at least one angular reflector lens and a reflector for reflecting light emitted by an automobile back towards the same automobile. Further, the housing comprises multiple light modules spaced apart and aligned along a common longitudinal plane. The multiple light modules are powered by one or more solar modules, located within the housing, and aligned along the common longitudinal plane.

An eleventh exemplary pavement marker module comprises the following components described in detail above with respect to the ninth exemplary pavement marker module which is described above. The eleventh exemplary pavement marker module comprising an elongated channel carved into a pavement surface and a housing configured for insertion into the channel.

The channel of the eleventh exemplary pavement marker module comprises a length extending from a proximal end to a distal end, defining a planar bottom surface with a tapered edge. The pavement marker's housing is configured for insertion into the channel such that the bottom of the housing fits flushly to and attaches with the channel's planar bottom surface.

Exemplary pavement marker modules can have interoperability with other devices and systems, including but not limited to traffic systems, other pavement marker modules, and vehicles. For instance, the pavement marker module could connect through wired or wireless communications to operate in conjunction with other pavement marker modules, to respond to traffic flow, conditions, events, and emergency situations.

In another example, the pavement marker module could respond to changes in traffic signals. In such a configuration, when a traffic signal turns green, the appropriate traffic lanes will light accordingly, otherwise will remain dark. Alternatively, appropriately colored pavement marker modules will provide a pavement level indication of green, or when the signal turns red, a pavement level indication of red.

In another example, in the event of an emergency, remote devices employed by traffic management centers, emergency vehicles, or automatic traffic monitoring systems could cause a pavement marker module to go on emergency flash, with an alternative to flash yellow or red rather than the normal lane marker color.

In another example, as a part of the energy conservation management, the pavement marker module may cooperate with other pavement marker modules in turning ON before traffic arrives by communicating ahead to turn those pavement marker module ON before the traffic arrives at that location to provide a lighted path for a distance ahead, and turn OFF after a brief time following passage of the traffic.

Figure 10:
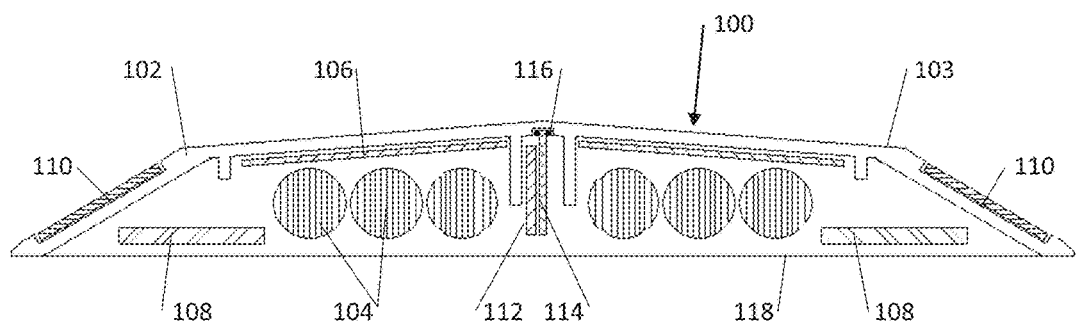
FIG. 10 is a first side view of an exemplary lighted pavement marker module having a receiver or transceiver capable of communicating with a processor.
Figure 11:
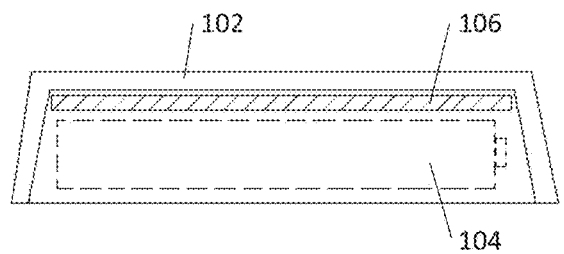
FIG. 11 is a second side view of an exemplary lighted pavement marker module having a receiver or transceiver capable of communicating with a processor.
Figure 12:
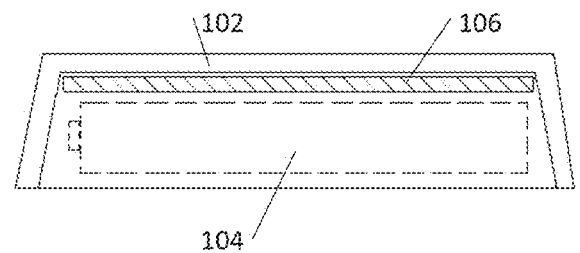
FIG. 12 is a third side view of an exemplary lighted pavement marker module having a receiver or transceiver capable of communicating with a processor.
Figure 13:
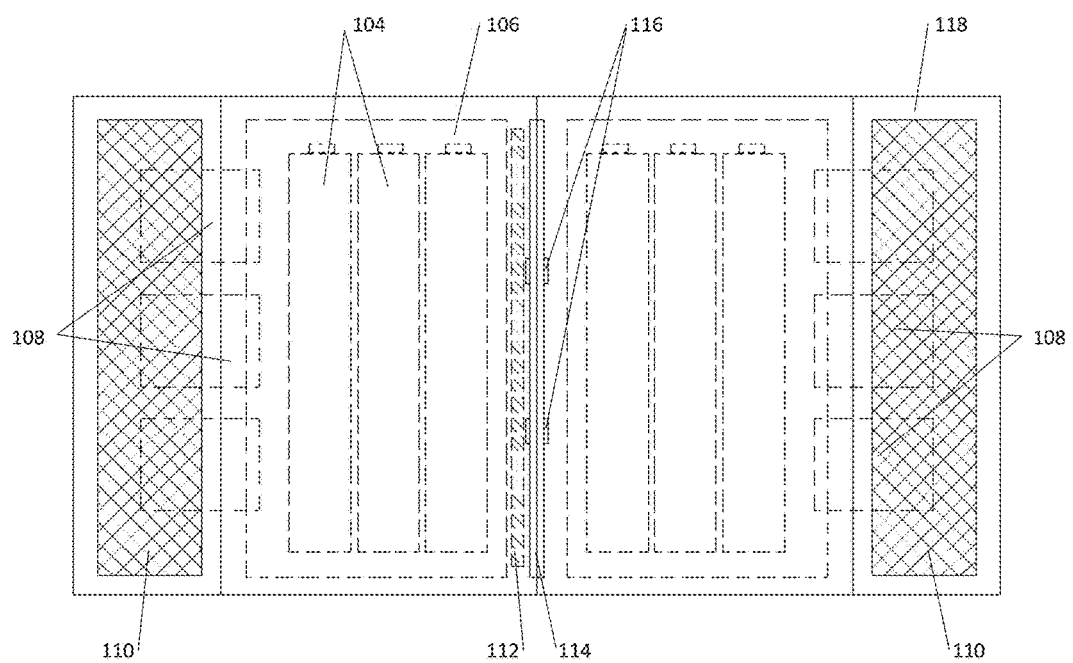
FIG. 13 is a top view of an exemplary lighted pavement marker module having a receiver or transceiver capable of communicating with a processor and showing the internal components of the marker module with dashed lines.
Figure 14:
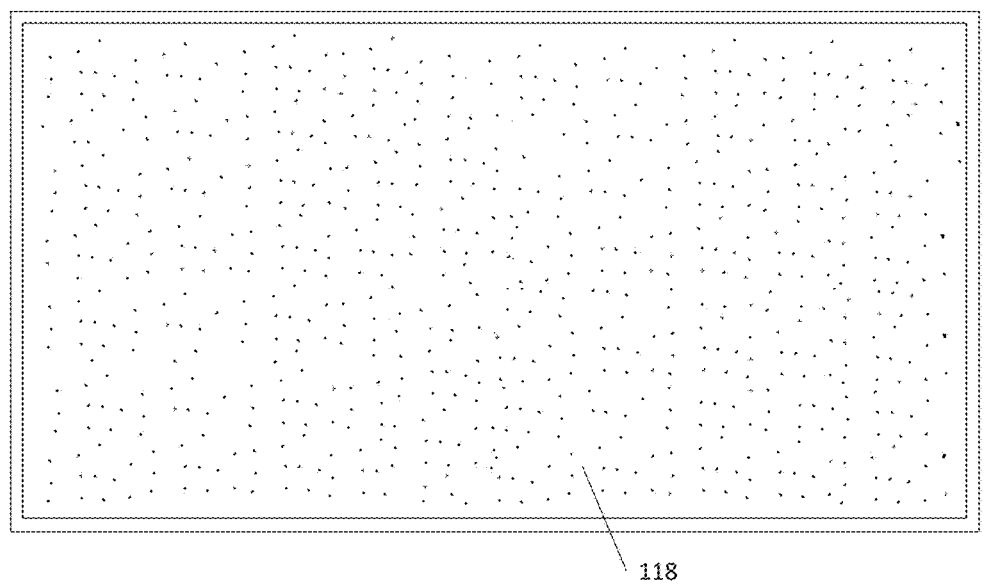
FIG. 14 is a bottom view of an exemplary lighted pavement marker module having a receiver or transceiver capable of communicating with a processor.
Figure 15:
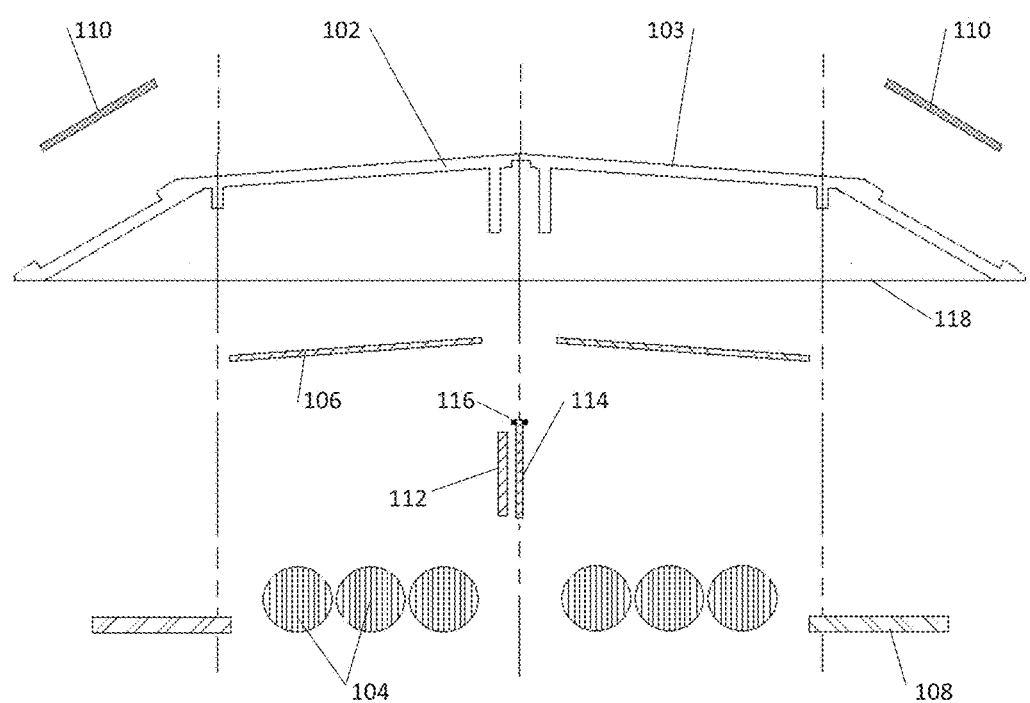
FIG. 15 is an exploded side view of an exemplary lighted pavement marker module having a receiver or transceiver capable of communicating with a processor.

FIG. 10 illustrates a preferred embodiment of the disclosed inventive concepts. FIGS. 10-15 illustrate a marker module or road module 100 having an autonomous, wireless communication and software system. The road module of FIG. 10 has a hard plastic case 102 that has a top 103 and a bottom 118 of the case. Reflectors 110 are embedded in the sides of the case. The sides of the case are angled such that if the road marker is embedded in a road surface, reflectors 110 will reflect light from an oncoming vehicle's headlights back at the vehicle. This will provide a marker system in the event that the lighted aspect of the depicted marker is out of an energy source. Energy sources 104 in a preferred embodiment can be made of batteries or capacitors, including ultra-capacitors. The energy source devices are designed to provide energy, typically in the form of electricity, to power a light 116. In a preferred embodiment the light 116 is an LED light. The road marker has a processing board 114 that serves to drive the light when activated. In a preferred embodiment the road marker has a receiver 112 and/or a transceiver for communication with an exterior processor. The exterior processor is configured to activate via wired and/or wireless communication the road marker to illuminate upon the processor being provided with a signal that a certain predetermined condition has been met. In a preferred embodiment, the processor is activated by a sensor. In the depicted embodiment a sensor 108 is positioned within the road marker depicted in FIG. 10. Alternatively, the sensor can be positioned exterior to the road marker and in connection, either wired or wirelessly, with the processor.

Alternatively, a processor could be integral with the road marker such that the processor will wired or wirelessly communicate from a master road marker to one or more slave road marker directing the slave markers to illuminate either simultaneously or in a procession. Similarly each road marker in a plurality of road markers can utilize an integrated processor. The road marker depicted in FIG. 10 has solar panels 106 that are configured for harvesting solar energy to provide for storage in the batteries 104 and to power the LED and thus to power the light 116. In a preferred embodiment the road marker is on the interior made up by a resin that envelopes and surrounds all of the components of the road marker in order to provide protection and stability to the components.

Figure 16:
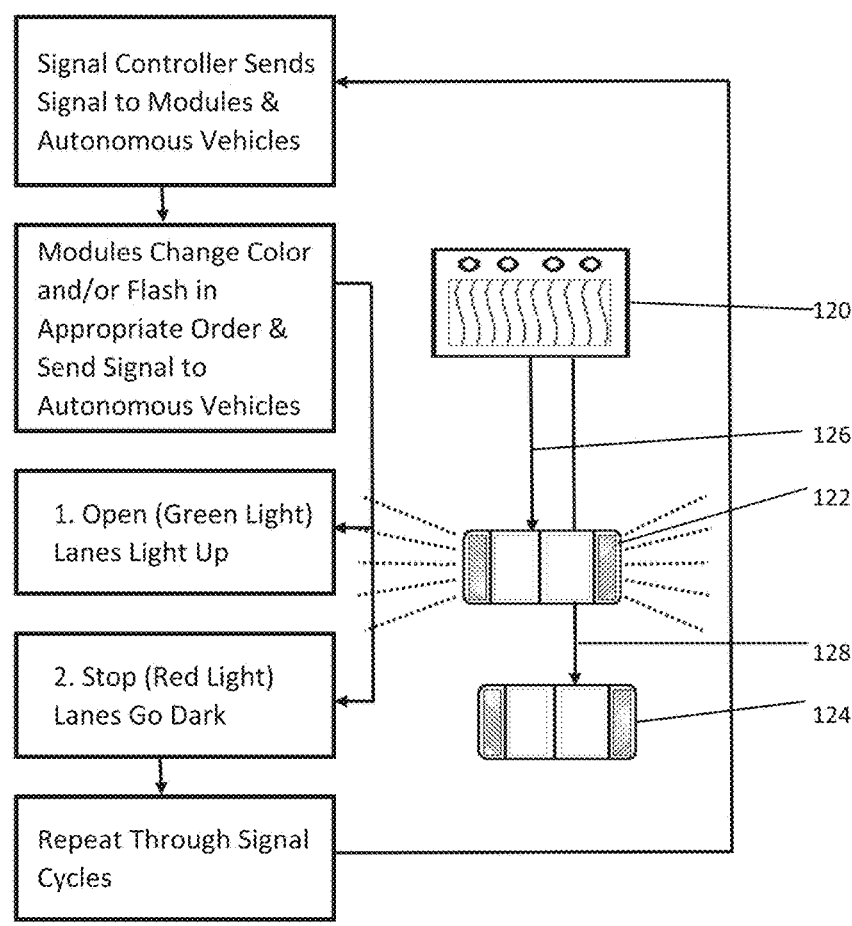
FIG. 16 illustrates a flow diagram of an embodiment of a traffic control system in which a processor interacts with lighted pavement modules and autonomous vehicles to signal the driver of a vehicle and/or an autonomous vehicle.

FIG. 16 depicts a signal logic flow chart and diagram of a process of signaling traffic of the preferred embodiment. In a preferred embodiment, a controller or processor 120 sends a signal 126, 128 to the road modules and/or one or more light strips 122, 124 to direct the road modules and/or one or more light strips to illuminate as depicted in illuminated road module 122. The processor can signal the road modules and/or one or more light strips to flash, illuminate, or flash in an order to send a signal to a vehicle. The processor either separately or in combination with the modules can send a signal to an autonomous vehicle of upcoming traffic conditions or road conditions. In a configuration in which the sensor and road modules and/or one or more light strips are at a traffic control light, the signal can be to a road module to light up green, to turn red or go dark, or to include a yellow or flashing light of any of the above colors. In one embodiment, each individual road module has one color of light. In other preferred embodiments, road modules and/or one or more light strips can include multiple light colors.

Figure 17:
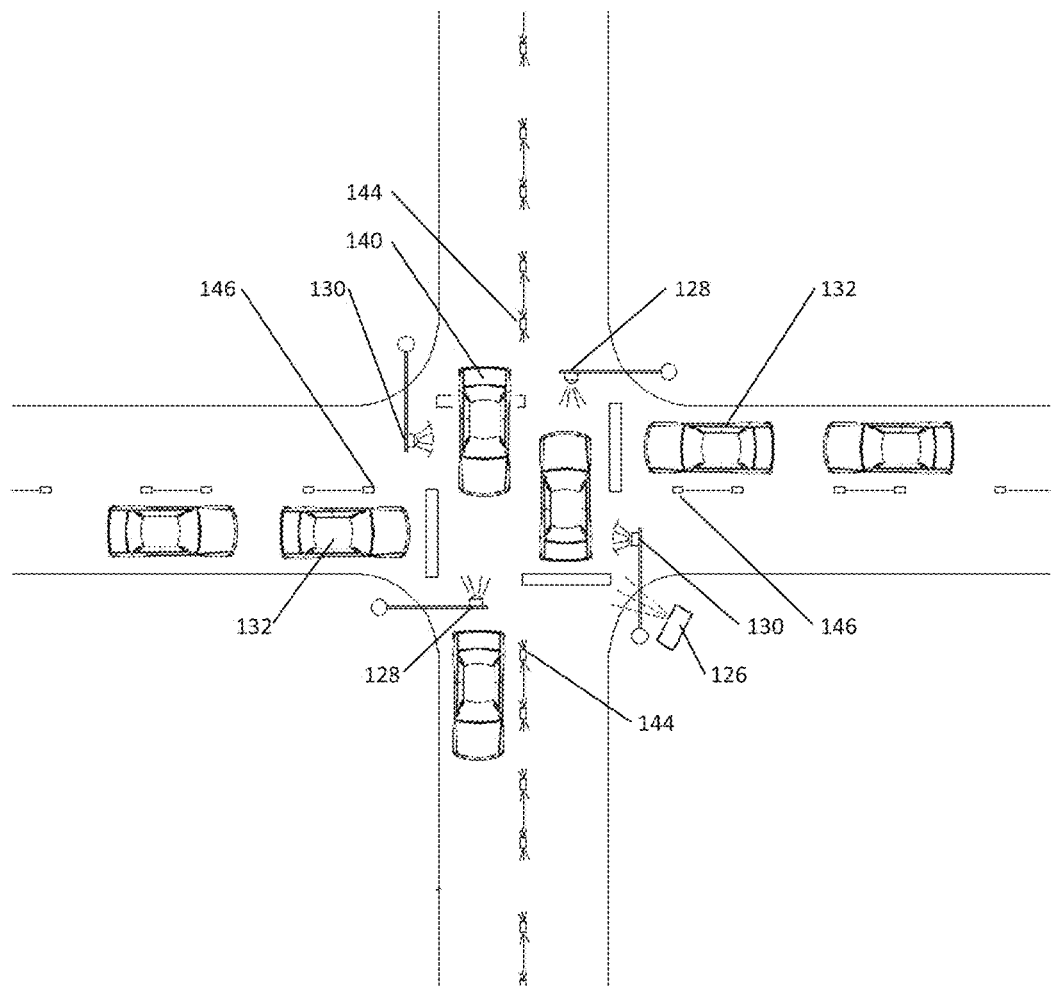
FIG. 17 illustrates an intersection at which traffic signals and road modules delineating road lanes interact with a processor to direct the road modules and traffic signals to illuminate and de-illuminate in a coordinated fashion.

FIG. 17 depicts a traffic control pattern in which the logic of FIG. 16 is being used. FIG. 17 depicts an intersection having four traffic lights 128, 130. Traffic lights 128 are on a go light for vehicles 140 traveling in the north-south directions of the intersection. Road modules and/or one or more light strips 144 are lit up in a green light in a preferred embodiment, although this could be flashing or an alternative signal mode. Vehicles 140 are traveling through the intersection. In the east-west directional lanes traveling from left to right and right to left in the figure, vehicles 132 are stopped at the intersection. Signal lights 130 are informing the vehicles to stop. Road modules and/or one or more light strips 146 are red or de-illuminated. Signal controller or sensor 126 is detecting the position of the vehicles and/or modulating the interaction between the road modules and/or one or more light strips and the traffic control lights.

Figure 18:
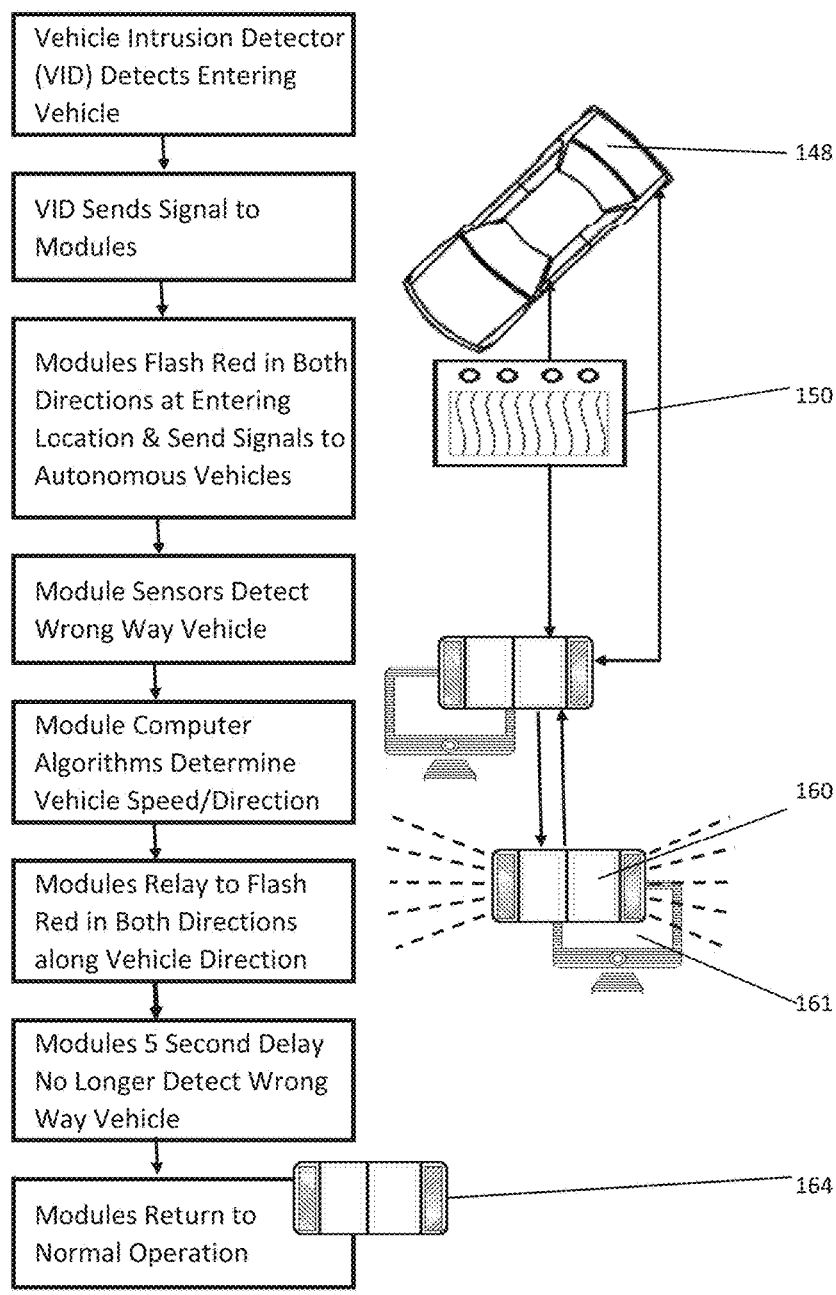
FIG. 18 illustrates a flow diagram of an embodiment of a traffic control system in which a sensor and associated processor direct road modules and/or one or more light strips to light up and/or flash in response to a vehicle traveling in the incorrect direction on a road.
Figure 19:
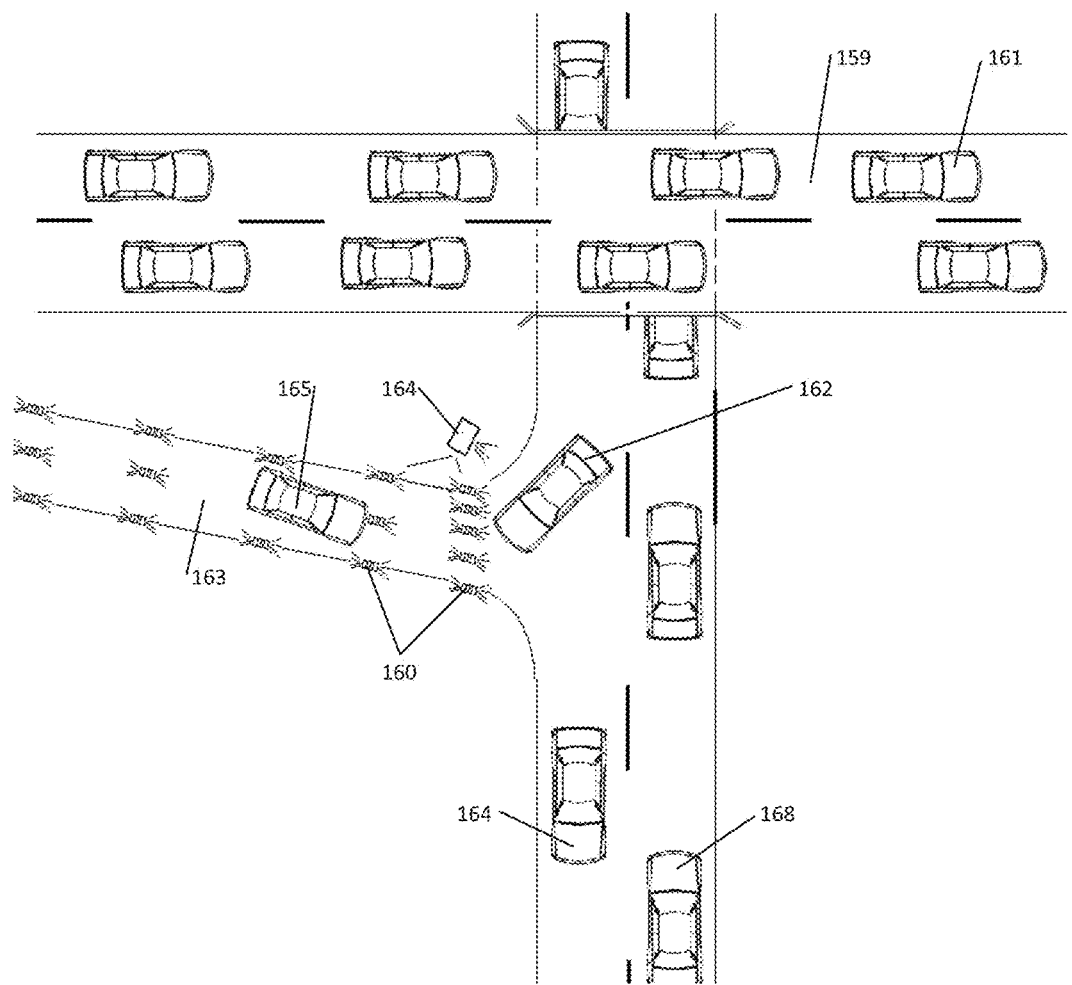
FIG. 19 illustrates an intersection pursuant to FIG. 18 at which a vehicle is traveling the incorrect direction on an interstate ramp and a system of the current disclosure is signaling to the vehicle that it is traveling in the incorrect direction.

FIGS. 18-19 depict logic controlling the road modules and/or one or more light strips when a vehicle enters the incorrect direction of a one way road. In a preferred embodiment, when a vehicle 148 enters a one way road 163 in the wrong direction, a sensor 164 located either within one or more road modules and/or one or more light strips or an exterior sensor senses the vehicle entering the wrong direction. If the vehicle traveling up the one way road 165 continues up the road, the sensor processor directs the road modules and/or one or more light strips 160 to flash. This flashing can be done in a warning color or it can be meant to spell wrong way in the intersection. In a preferred embodiment, there is a relay 150 from the processor 161 to the vehicle and from the vehicle to the processor.

In a preferred embodiment a solar energy collector is positioned proximate to the road modules and/or light strips to provide power to the road modules and/or light strips. In a further preferred embodiment the solar energy collector is connected to an energy storage device, such as a battery, that stores energy for future use by the system. Alternatively, the road modules and/or light strips can be wired for power from an external source.

FIG. 19 depicts a traffic flow diagram in which a vehicle 162 is traveling onto, for example, a highway exit ramp 163. The sensor and/or processors detect the wrong way vehicle traveling. In order to prevent the vehicle from traveling in the wrong direction and entering the highway 159 and going head to head with vehicles traveling in the correct direction on the highway 161, the sensor and processor can direct lights to flash, or illuminate such that the vehicle 162 traveling in the incorrect direction is alerted. In the case of an autonomous vehicle, the system could direct the autonomous vehicle to stop, reverse direction, and/or move out of the direction of traffic. FIG. 19 depicts an interstate highway 159, in a typical embodiment, in which vehicles are traveling in a one way direction 161. The vehicles are able to exit the highway via off ramp 163 in which vehicles travel generally in the same direction as the route to travel of the highway 159.

Figure 20:
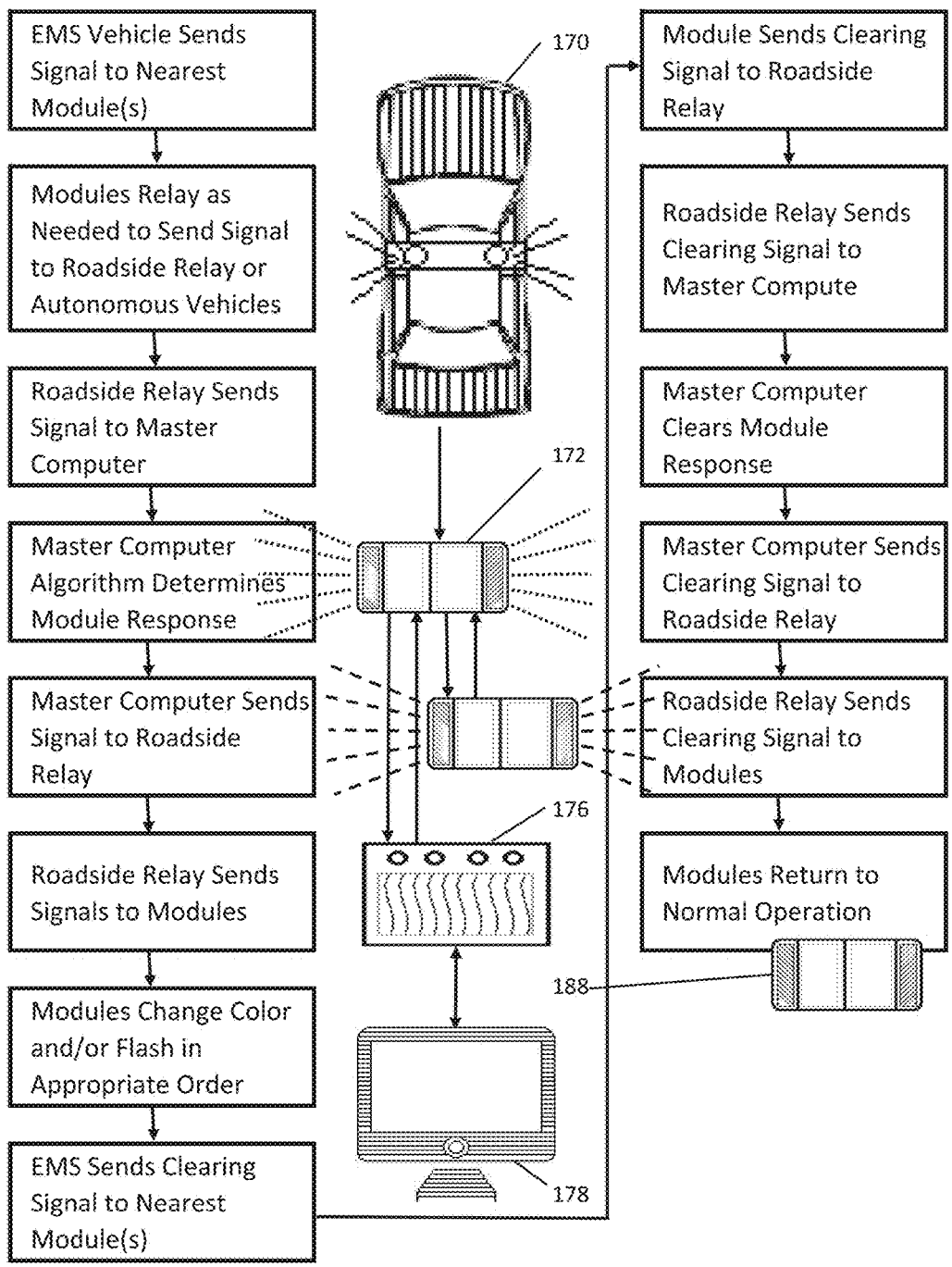
FIG. 20 illustrates a flow diagram of an embodiment of a traffic control system in which an EMS vehicle interacts with the traffic control system to provide signaling via road modules and/or one or more light strips to drivers of vehicles and/or autonomous vehicles of the approach and departure of an EMS vehicle relative to a sensor of the system.
Figure 21:
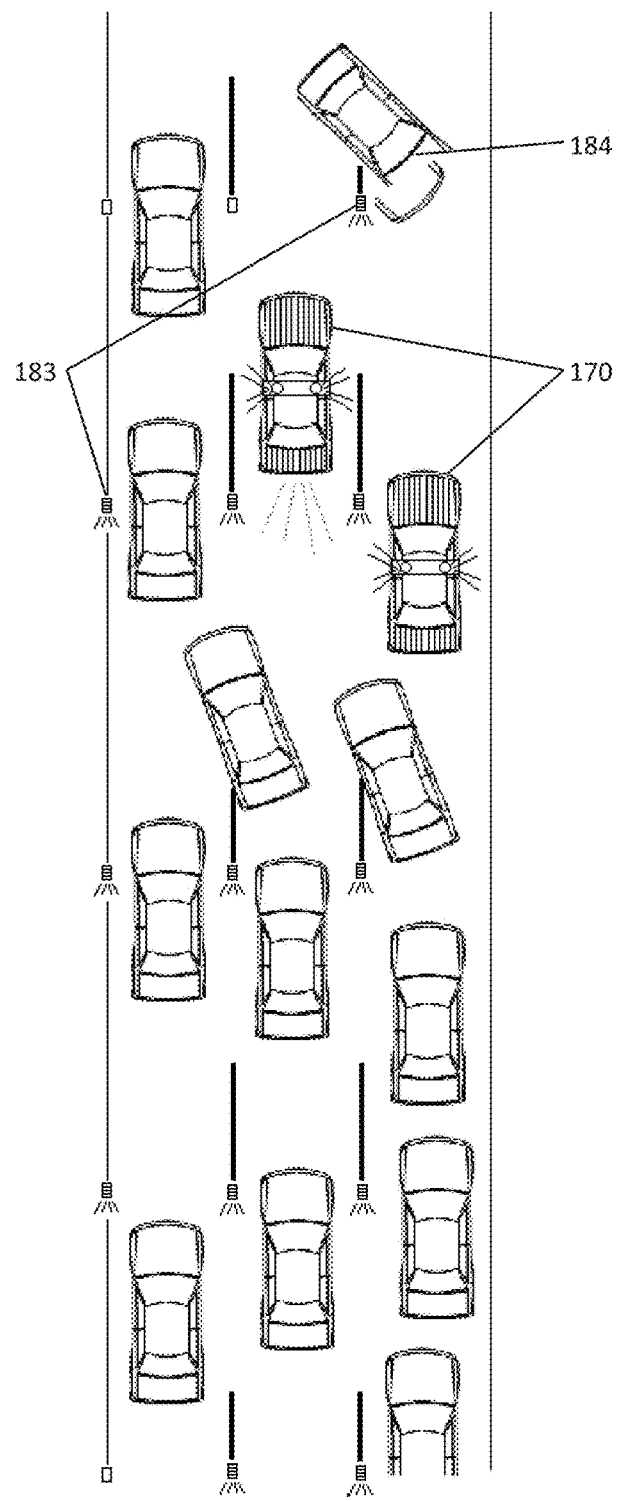
FIG. 21 illustrates a road incorporating a traffic control system according the flow diagram of FIG. 20.

FIGS. 20 and 21 depict a preferred embodiment of a logic control of a system of road modules and/or one or more light strips in response to an emergency services vehicle or similar emergency vehicle entering a predetermined area of the highway. In a preferred embodiment, EMS vehicles 170 are configured to interact with the road module system. Examples of this interaction would be a passive interaction system in which the road module sensor or exterior sensor connected to a road module system configured to detect an oncoming EMS vehicle. The detection of the oncoming vehicle by a sensor which relays 176 the sensed oncoming EMS signal to a processor 178. The processor directs a series of road modules and/or one or more light strips to illuminate to provide warning to vehicles traveling on the road. Additionally, the system can be configured to provide an alert to a vehicle on the road that an EMS vehicle is approaching. This allows the users of the vehicle to pull the vehicle to the side of the road or alternatively, for an autonomous vehicle to pull over to the side of the road. After the road has cleared, the EMS vehicle passes through the area, and the system deactivates 188 or changes the color of the flashing LEDs to indicate that the EMS vehicle has passed the area. FIG. 21 depicts a traffic flow chart in which an EMS vehicle 170 is traveling in a direction from the bottom to the top of the figure. The EMS vehicle is sensed by the road modules and/or one or more light strips 172, 183 or an alternative sensor. The system then directs oncoming vehicles 184 to move out of the way, to the side of the road. This can also provide feedback to the emergency vehicle as to which lane the oncoming or upcoming traffic is in and allow the EMS vehicle to move accordingly. When the EMS vehicle has exited the predetermined area the system directs the road modules and/or one or more light strips to de-illuminate or to change color to indicate that the EMS vehicle has left the area.

Figure 22:
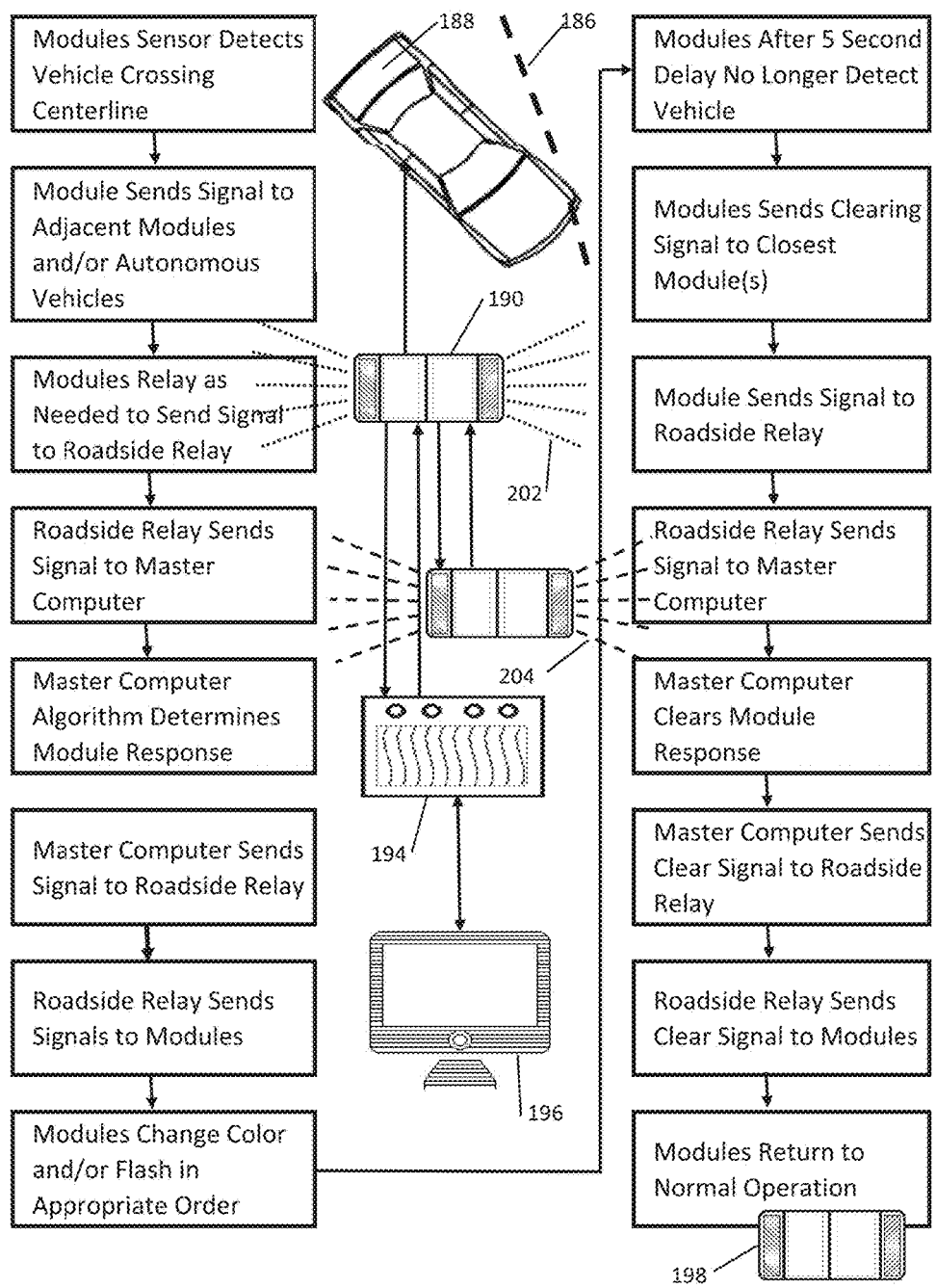
FIG. 22 illustrates a flow diagram of an embodiment of a traffic control system in which the system is providing road lane delineation guidance to a vehicle traveling on a road.
Figure 23:
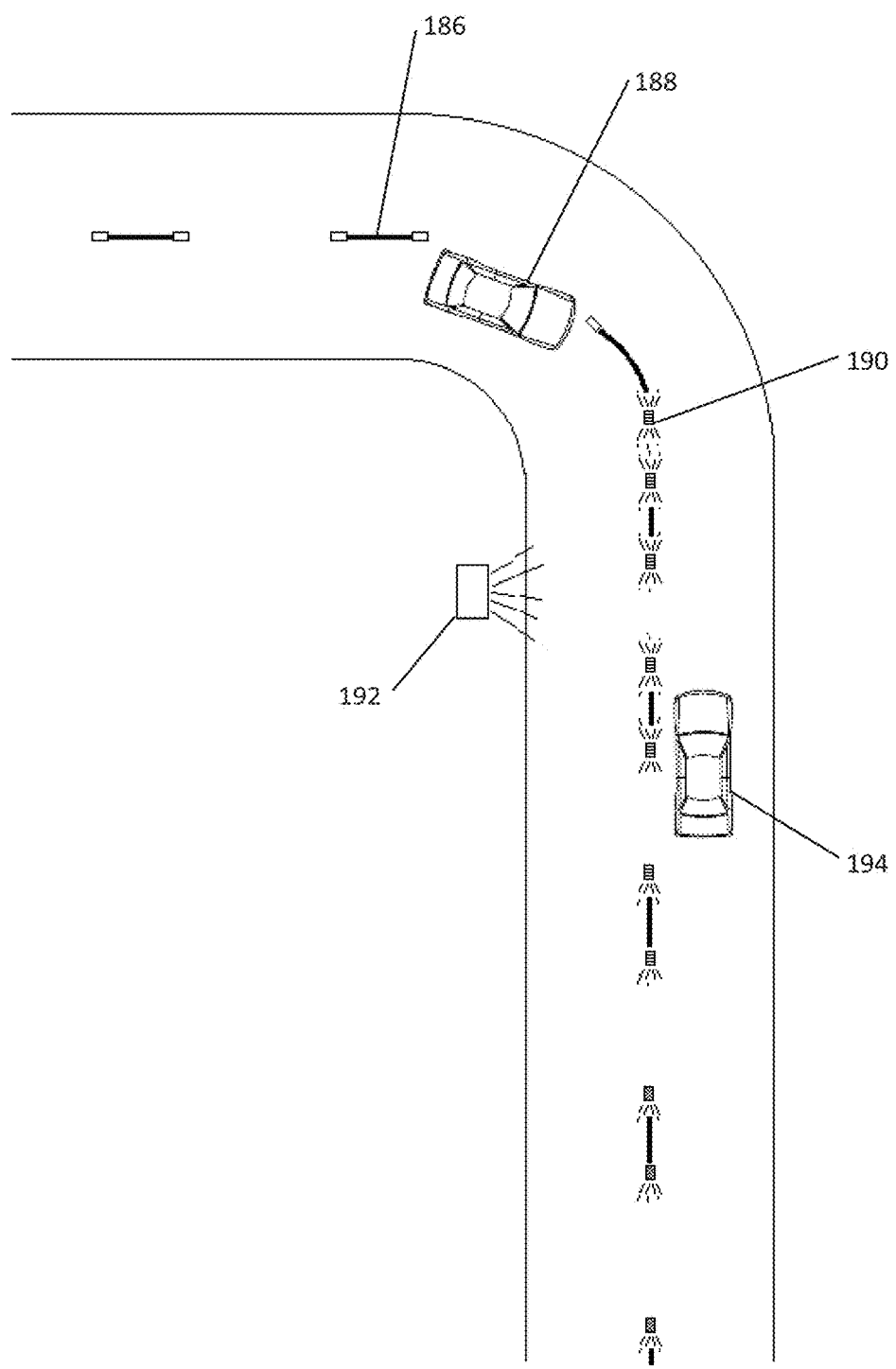
FIG. 23 illustrates a road incorporating a traffic control system according to the flow diagram of FIG. 22.

FIGS. 22 and 23 depict logic in a flow chart of the system when a vehicle crosses the line demarking traffic direction. In the depicted embodiment, a vehicle 188 is traveling in a lane of traffic that is divided from an opposing lane of traffic by traffic lane diver lines 186. When the vehicle crosses these lines 189 a sensor 192 that can be located within a road module or exterior to a road module senses that the vehicle has crossed the line. The sensor then relays this to a central processor, either via relay or otherwise, and the central processor alerts the traffic modules to illuminate via signal 202, 204. Alternatively, if the sensor is located within the signal module 190, the signal module alerts the processor via signal 202 that a vehicle has crossed the line. A signal relay 194 can be utilized between the road modules and/or one or more light strips and a processor 196. The processor will then signal back to the signal relay to illuminate or change the color of the road modules and/or one or more light strips. The system can operate such that the road modules and/or one or more light strips can be illuminated all at once or sequentially with the flow of traffic. After the vehicle has returned to the correct lane of travel or has passed from the area of a given road module, the sensor will sense that the vehicle is no longer in the incorrect lane or in the area in which notification is needed, and the processor will direct the road modules and/or one or more light strips to change color or de-illuminate 198.

Figure 24:
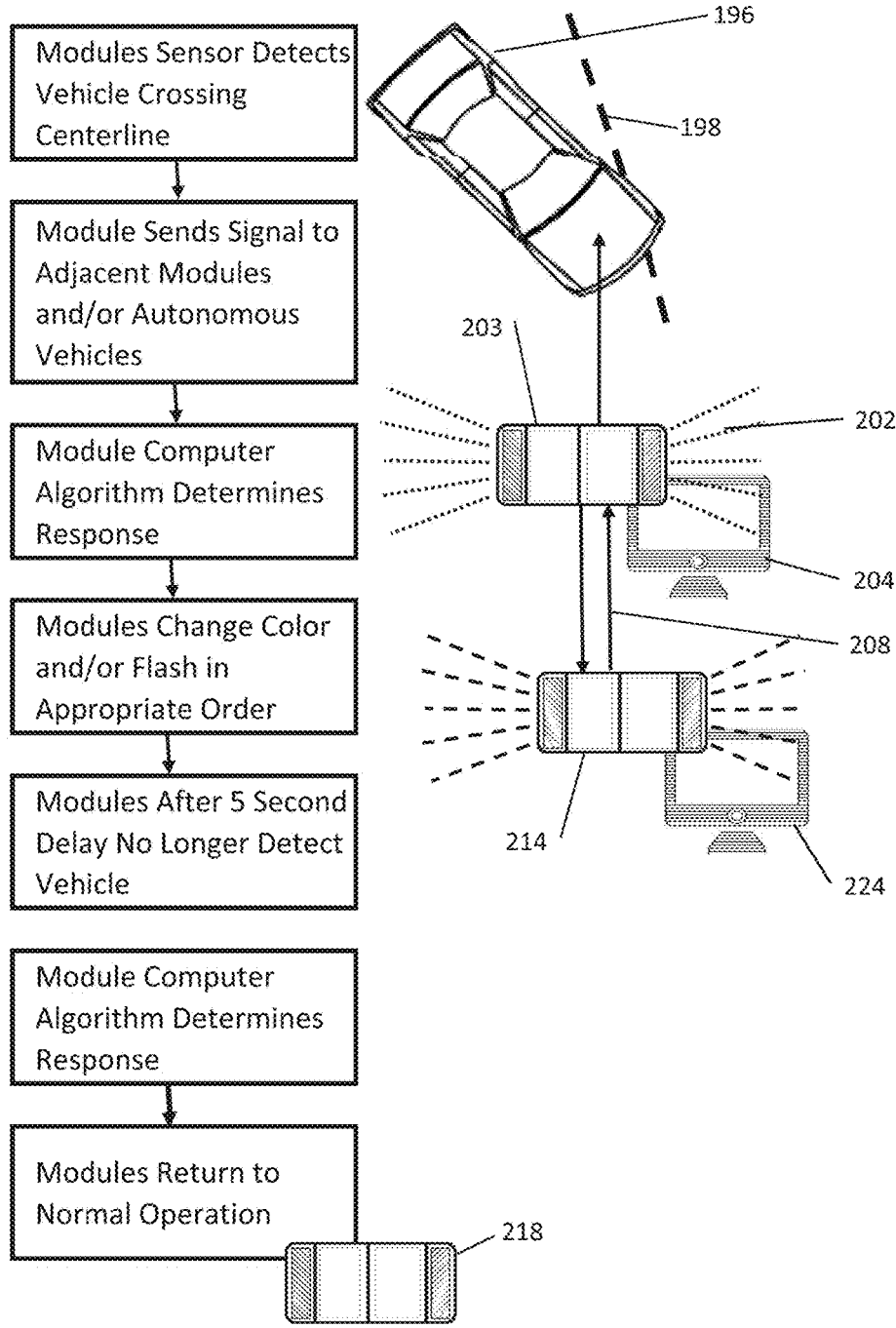
FIG. 24 illustrates a flow diagram of an embodiment of a traffic control system in which the system is providing road lane delineation guidance to an autonomous vehicle.
Figure 25:
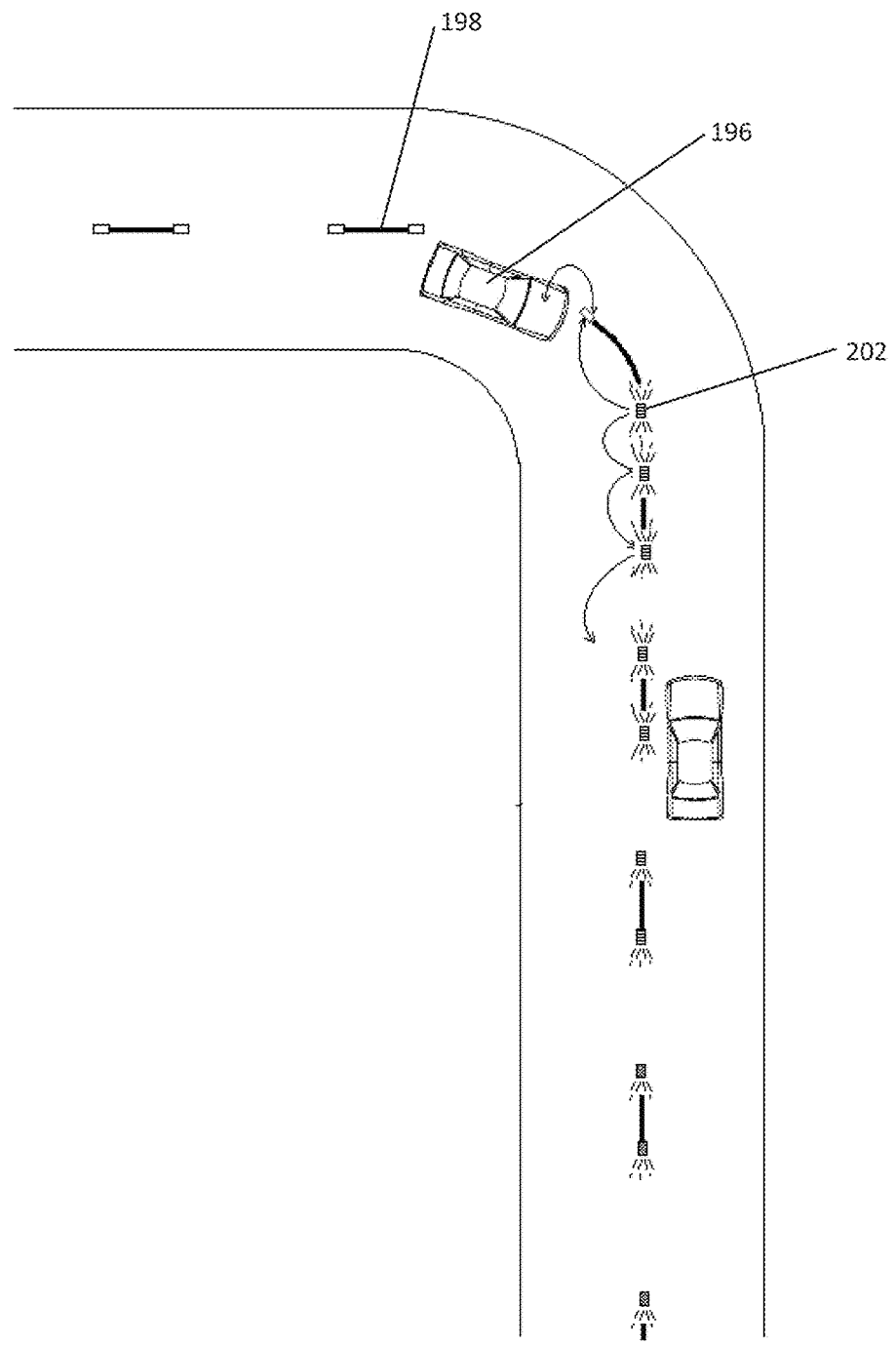
FIG. 25 illustrates a road incorporating a traffic control system according to the flow diagram of FIG. 24.

FIGS. 24 and 25 depict a second preferred embodiment of the logic of the system in which a vehicle 196 crosses the divider of a traffic lane 198. A sensor detects that the vehicle has crossed the lane and alerts the processor 204 that the vehicle is in the incorrect lane. The processor 204 of a given predetermined area interacts with the road modules and/or one or more light strips of that area to illuminate or send out signals 214. Processor 224 directs the signal controllers 203 in a given area to illuminate or send out other signal 202 to oncoming vehicles that the vehicle 196 has crossed the lane into an improper lane of traffic. As the vehicle 196 continues in the incorrect position, the signal controllers could be programmed to inform subsequent signal controllers on the road or subsequent road modules and/or one or more light strips of the vehicle's approach. These processors can then direct subsequent road modules and/or one or more light strips to illuminate. The prior road modules and/or one or more light strips can be directed to de-illuminate 218 as the threat proceeds.

Figure 26:
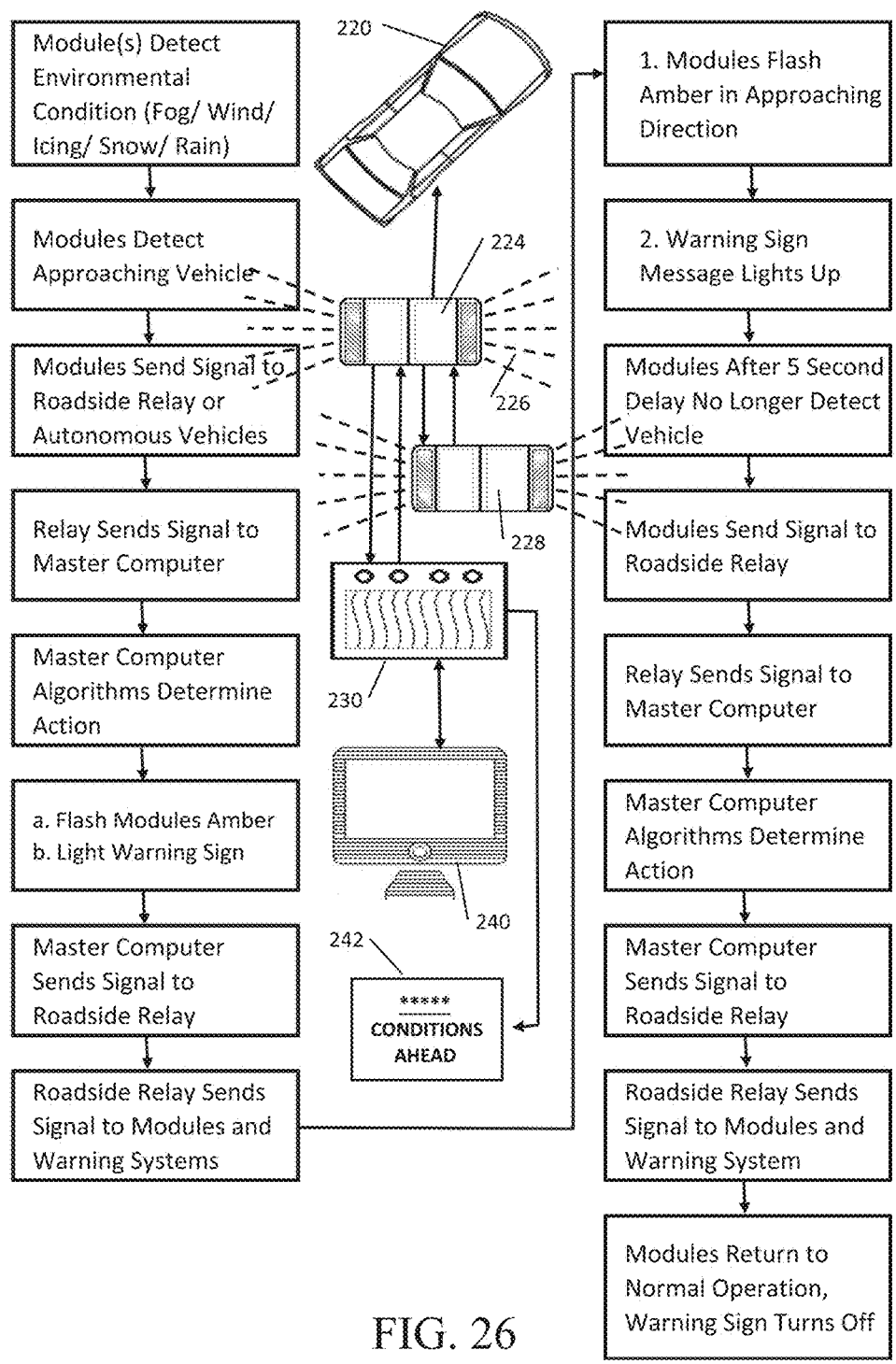
FIG. 26 illustrates a flow diagram of an embodiment of a traffic control system in which the system directs a plurality of road modules and/or one or more light strips to illuminate and/or flash and to display road hazard notification on a traffic control sign.
Figure 27:
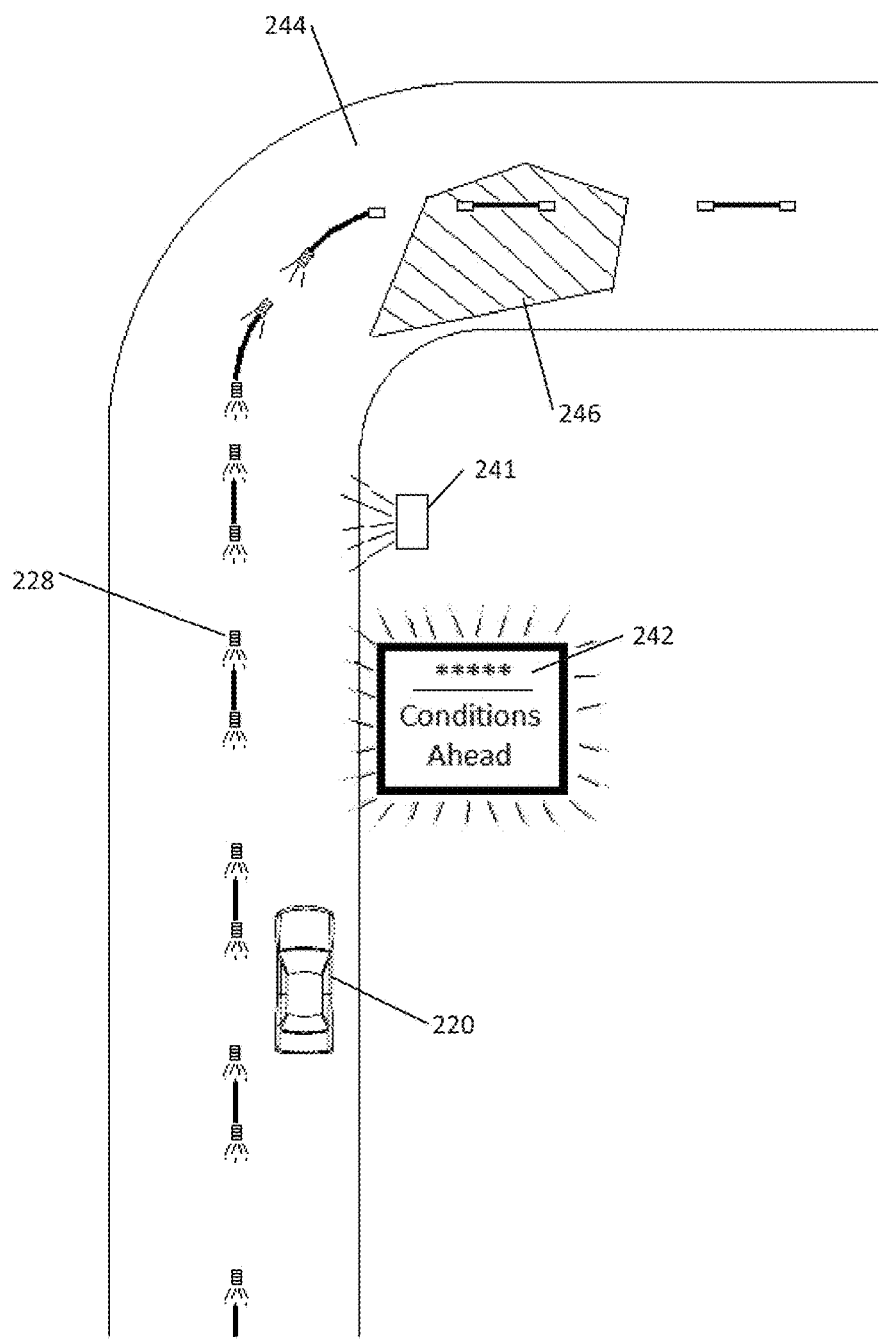
FIG. 27 illustrates a road incorporating a traffic control system according to the flow diagram of FIG. 26.

FIGS. 26 and 27 depict a road diagram in which a hazard 246 is present on a road 244. A sensor 241 detects the hazard on the road. The sensor can, again, be integral with one or more road modules and/or one or more light strips or can be an independent sensor along the road. The sensor transmits the information to a processor 240 either directly or via a signal relay 230. The processor directs one or more road modules and/or one or more light strips 224, 228 to illuminate 226, thus providing notification to oncoming vehicles 220 traveling on the road 244 of the hazard. This processor can also direct a road sign 242 or similar indicator to tell oncoming traffic of the existence of the conditions ahead. Similarly, the system can be utilized to direct emergency vehicles or other authority of the impending conditions. This can allow the authority to dispatch to the area or to close the road if needed.

Figure 28:
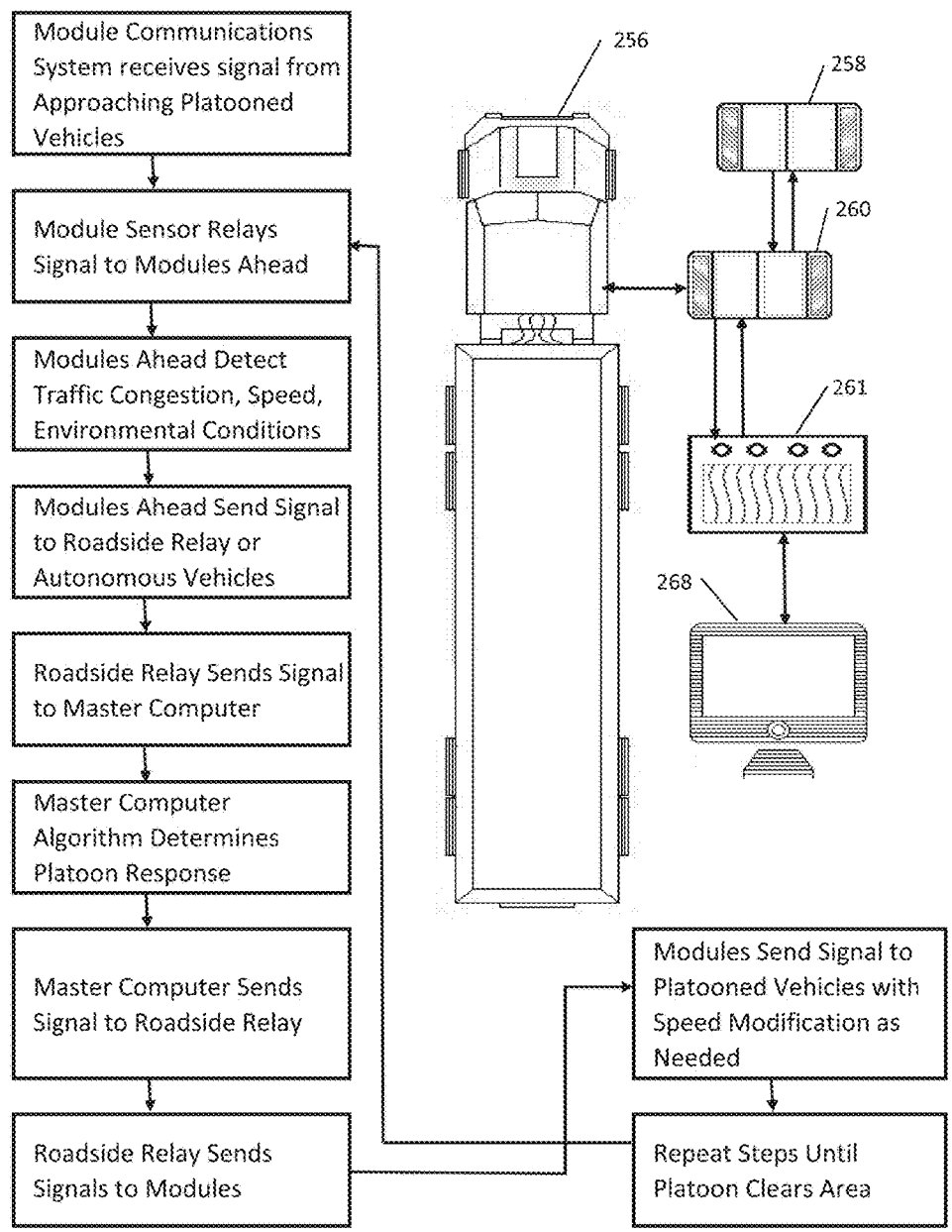
Figure 30:
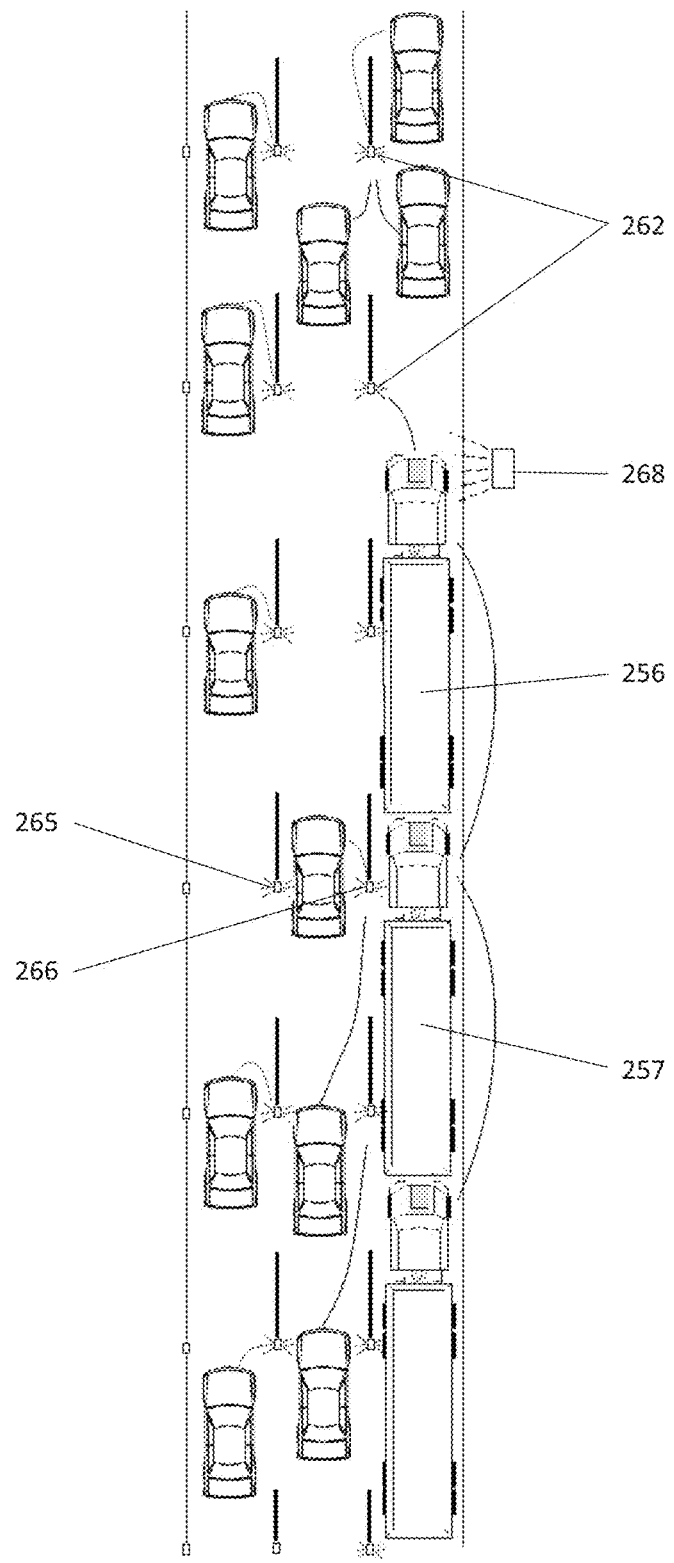

FIGS. 28-30 depict a preferred embodiment of a flow of logic and a traffic flow diagram depicting interaction between a preferred embodiment of a road module system in conjunction with an autonomous vehicle system. In the system an autonomous vehicle 256 or two autonomous vehicles 256, 257 are traveling down a road 265. Either an exterior sensor or an integrated sensor in a road module 262, 266 senses the approach and associated information with the vehicles including, for example, vehicle speed, vehicle number, and vehicle direction of travel. The sensors communicate with the processor 268 via optional relay 262. Optionally the processor 268 can be attached to an external sensor or can include an integrated sensor. The design of the system allows the autonomous vehicles of the platoon to adjust speed and/or vector enabled to react to traffic sensed by the sensors positioned in the road modules and/or one or more light strips 258, 260. This allows the vehicles to adjust speed due to factors such as traffic congestion or environmental conditions ahead. The system can be either one system determined for the entire length of the road or a plurality or multitude of interacting systems with separate processors and sensors or with a plurality of sensors integrated with a single processor. The processor can also be configured to communicate with separate autonomous or non-autonomous vehicles in order to provide information regarding the autonomous vehicle and/or platoon to the vehicles in order to direct vehicles to change rates of states and/or trajectory in response to the oncoming autonomous vehicles.

Figure 31:
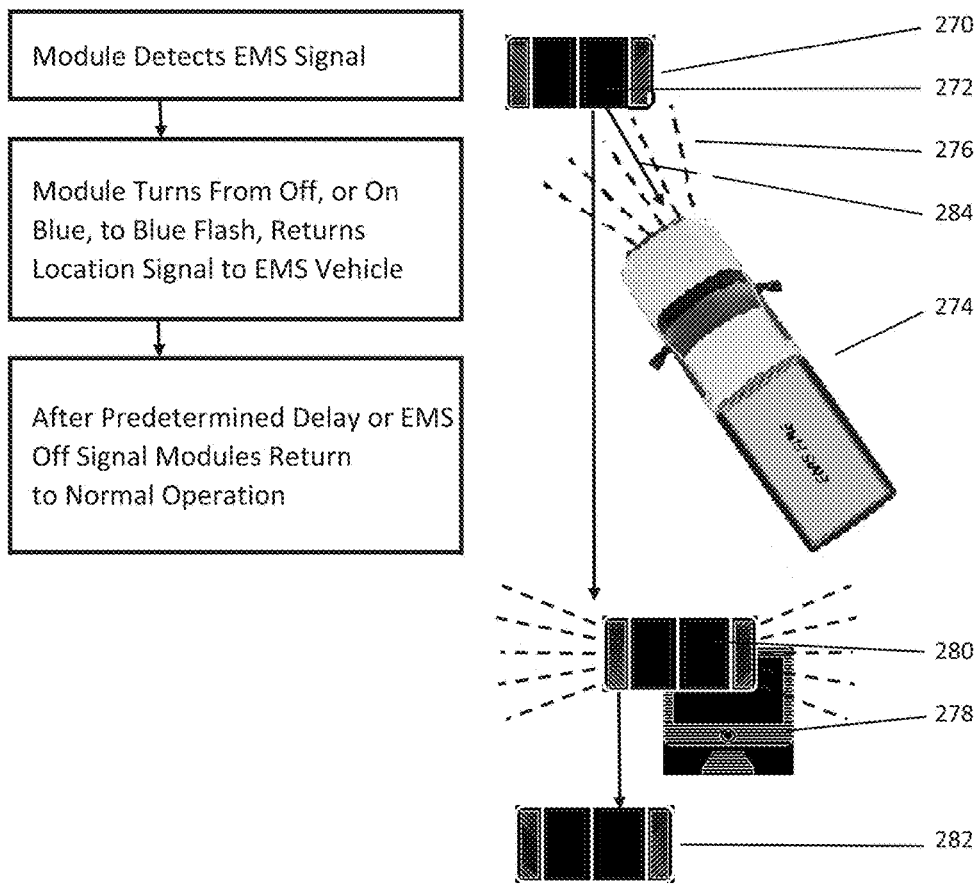

In a further embodiment depicted in FIG. 31, a module is provided that is configured to detect a signal from a vehicle and to illuminate and/or flash in response to a predetermined signal from a vehicle. In a preferred embodiment the predetermined signal is emitted wirelessly from an EMS vehicle, such as a fire engine. The wireless module is embedded on or in a roadway or along a roadway in proximity to a fire hydrant. The wireless module illuminates and/or flashes in response to the EMS vehicle signal to notify the EMS vehicle of the location of the fire hydrant. Alternatively or in addition to illuminating and/or flashing, the wireless module can be configured to send GPS coordinates or other locating information to the EMS vehicle to facilitate the EMS vehicle and/or any passengers and/or drivers of the EMS vehicles in locating the fire hydrant.

FIG. 31 depicts a logic flow diagram of a traffic control system and method of utilizing a traffic control system controlling a road module(s) when an EMS vehicle 274 approaches a road module 270 located in proximity to a fire hydrant (not shown). In a preferred embodiment, when a vehicle approaches a fire hydrant, a sensor 272 located either within or on the road module(s) or an exterior sensor senses the vehicle approaching. In a preferred embodiment the EMS vehicle emits a signal 276 sensed by a sensor on, in or near the road module located proximate to the fire hydrant. If the sensor detects a signal from an EMS vehicle, a processor 278 directs the road module(s) 280 to illuminate and/or flash. This flashing and/or illumination is, in a preferred embodiment, done in a standard EMS color of blue. Alternatively or in addition to illuminating or flashing, in a preferred embodiment, there is a relay from the processor 278 to the vehicle and/or from the vehicle to the processor. The relay from the processor to the vehicle can be a signal configured to alert the EMS vehicle or passengers thereon as to the location of the road module and fire hydrant. In the depicted FIG. 31 the processor is located in the road module 270 and the relay from the processor to the EMS vehicle is shown by arrow 284

Figure 32:
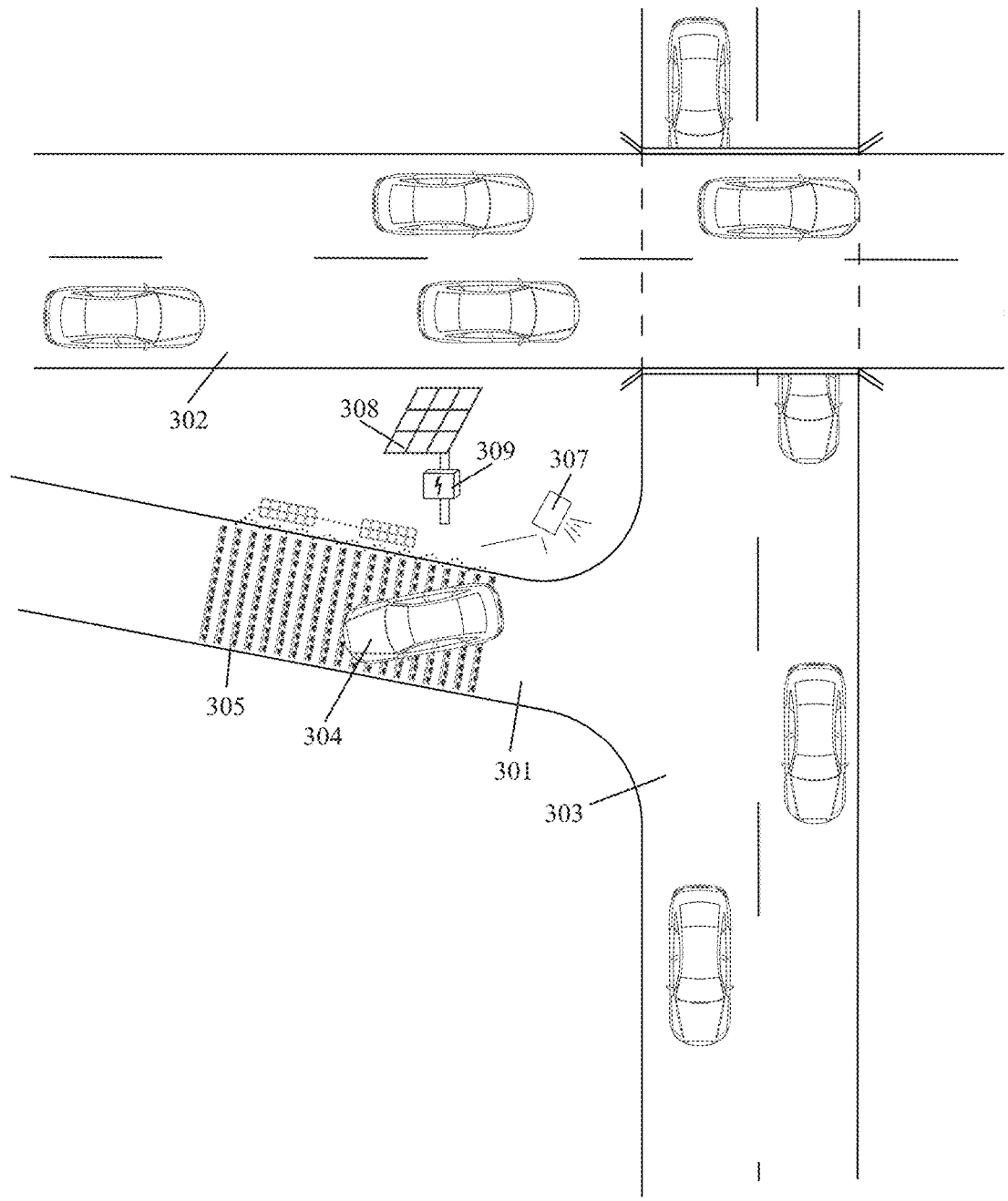
FIG. 32 illustrates an embodiment of an off ramp of an interstate highway having light strips positioned in the surface of an off ramp.

FIG. 32 depicts an intersection of an off ramp 301 from a roadway 302, such as an interstate highway, intersection with a second road 303. A vehicle 304 is shown traveling on the off ramp in an incorrect direction. Light strips 305, 306 are illuminated to notify the driver of the vehicle that the vehicle is traveling in an incorrect direction. A sensor 307 is positioned to detect the vehicle entering in the incorrect direction. A processor has utilized a communication from the sensor to cause the light strips to illuminate and/or flash in response to the vehicle entering in an incorrect direction. A solar energy collector 308 is shown and battery 309 for providing power to the light strips. In a preferred embodiment, the light strips utilize one or more light emitting diodes (LEDs) and/or another type of light. The light strip(s) can further be utilized in connection with one or more road modules.

Figure 33:
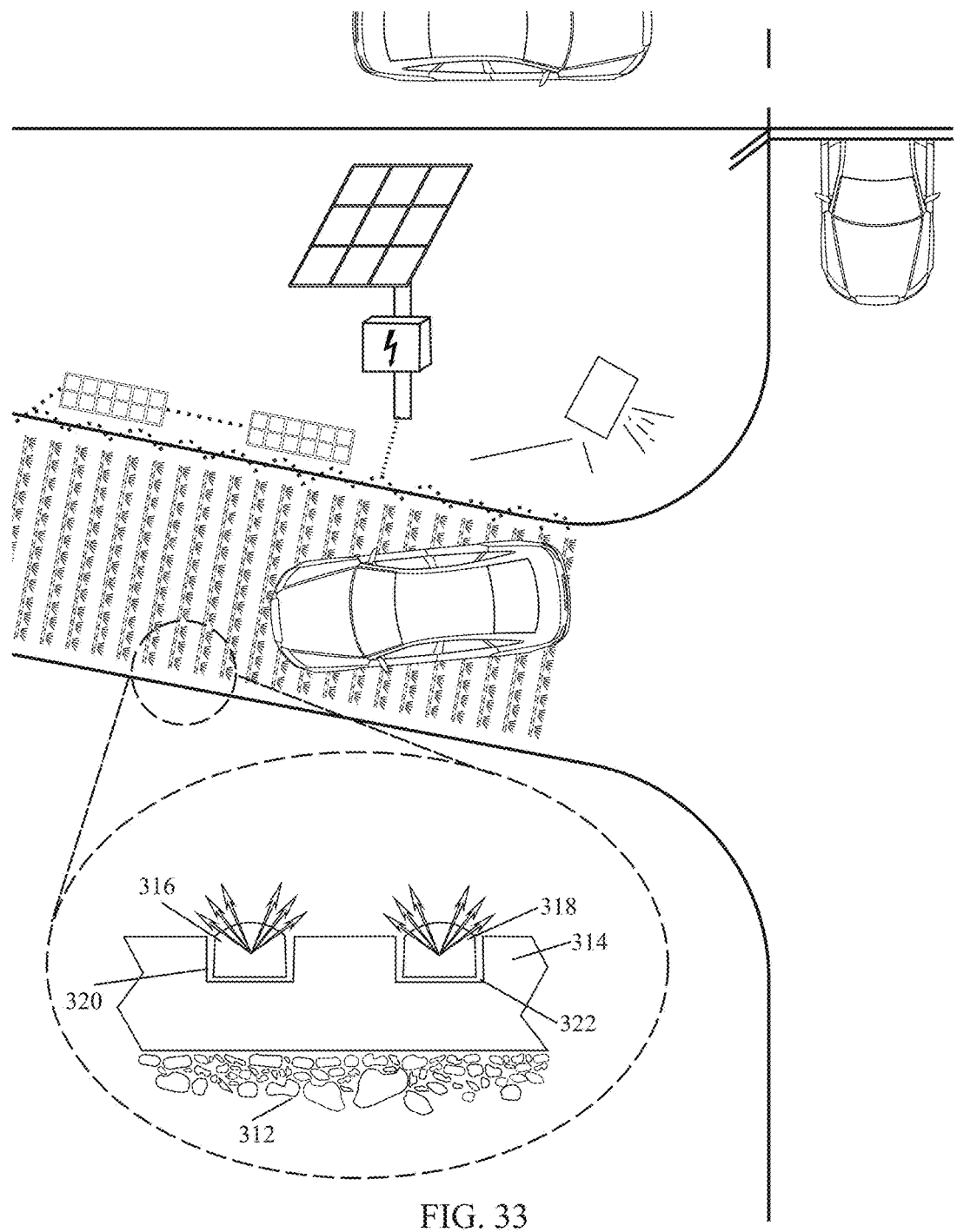
FIG. 33 is a close up illustration of the embodiment of FIG. 29 with a cut away view of a light strip positioned in the surface of an off ramp.

FIG. 33 further depicts a cross section 310 of the roadway showing a typical road having a base 312 and pavement 314. The cross section depicts light strips 316, 318 positioned in channels 320, 322 of the roadway. The light strips are shown in an illuminated and/or flashing mode.

Figure 34:
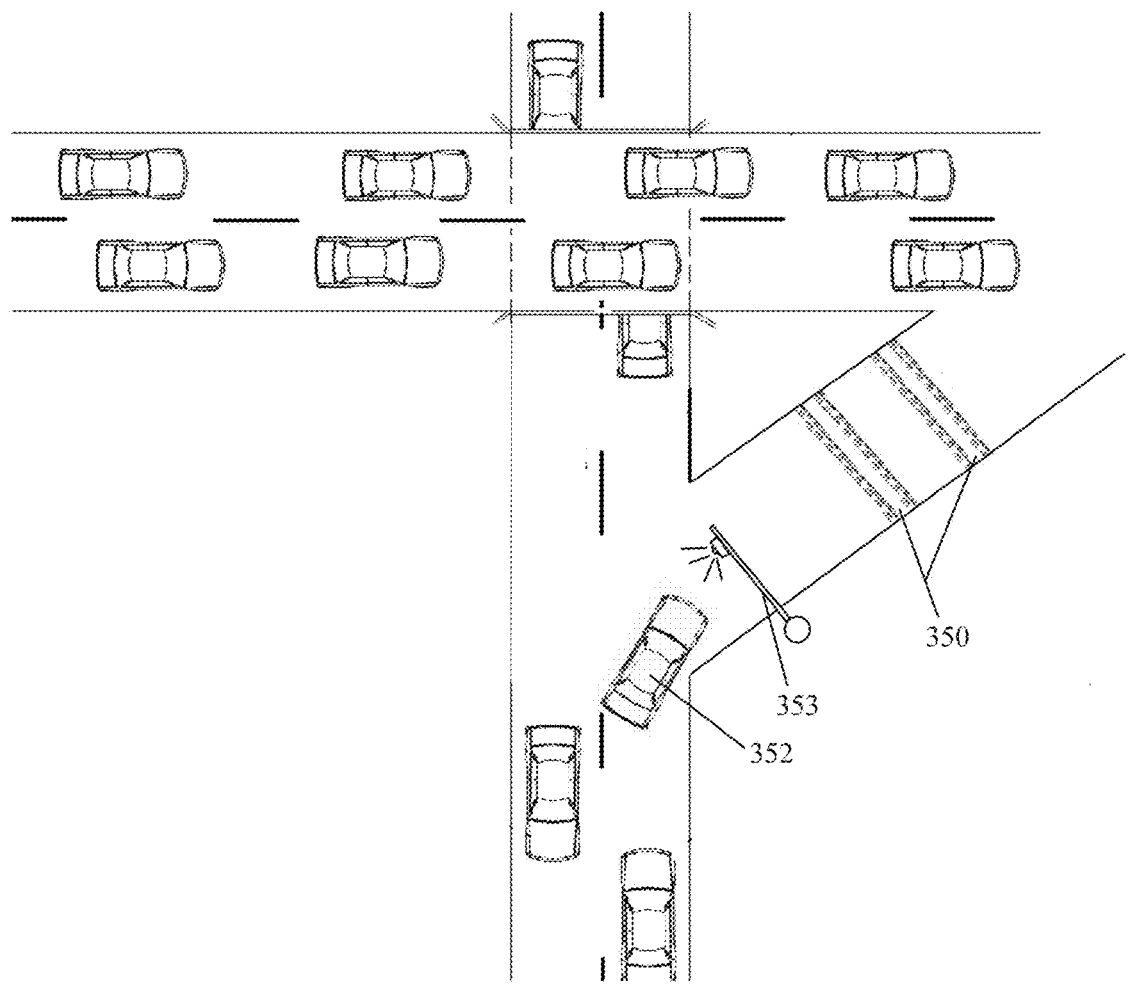
FIG. 34 illustrates an embodiment of an on ramp of an interstate highway having light strips positioned in the surface of an upstream on-ramp.

FIG. 34 depicts an upstream warning system used in conjunction with the system depicted at least in FIGS. 32 and 33. An upstream warning system utilizing road modules and/or light strips 350 used in conjunction with a traffic signal 353 to alert vehicles traveling in a correct direction 352 on a roadway that a vehicle is approaching in an incorrect direction (as shown in FIGS. 32 and 33). This upstream warning system can utilize power mechanisms as discussed previously. The system can be communicated to by the processor of the warning system depicted in FIGS. 32 and 33 or alternatively can include a second processor configured to communicate to the processor of FIGS. 32 and 33. This system is utilized, for example, to prevent and/or warn vehicles traveling on or about to enter an interstate highway in the incorrect direction of a vehicle traveling toward them in the wrong direction. It is thought that this feature may assist in preventing crashes between vehicles traveling in the correct direction when a vehicle enters the roadway in the incorrect or wrong direction.

In alternative embodiments the system and method depicted in FIG. 31 can be utilized in alerting a vehicle to the location of a bus stop, an intersection with a pedestrian or bicycle path either occupied or unoccupied, a railroad crossing, or other traffic or road condition. In a preferred embodiment the road module(s) associated with the traffic or road condition coincide with general colors commonly used with that condition. For example, blue light is commonly associated with a fire hydrant, green light with a bus stop, yellow or amber light for caution around an occupied crosswalk or intersection with a bicycle and/or pedestrian path, or railroad crossing.

It is noted that all structures and features of the various described and illustrated embodiments can be combined in any suitable configuration for inclusion in a pavement marker module according to a particular embodiment. For example, a pavement marker module according a particular embodiment can include neither, one, or both of the power storage devices described above.

The foregoing detailed description provides exemplary embodiments of the invention. The description and illustration of these embodiments is intended only to provide examples of the invention, and not to limit the scope of the invention, or its protection, in any manner.

The invention claimed is:

1. A method of providing enhanced traffic signaling in response to road surface conditions and/or traffic conditions, said method comprising the following steps:

the step of providing a plurality of road modules and/or one or more light strips, wherein said road modules and/or one or more light strips comprise a light configured for illumination and de-illumination, wherein said road modules and/or one or more light strips are embedded in or affixed to the surface of a road in a road lane designated for vehicles traveling in a first direction, wherein said road modules and/or one or more light strips comprise a receiver configured for communicating with a processor, wherein said road module is configured to illuminate, change color, or flash in response to said response to said communication from said processor;

the step of providing at least one sensor configured for detection of a vehicle traveling in a direction generally opposite to said first direction;

the step of providing at least one processor in connection with said sensor and in connection with said plurality of road modules and/or one or more light strips, wherein said processor is configured to activate said lights of said road modules and/or one or more light strips to illuminate when a vehicle is traveling in said road lane in a generally opposite direction to said first direction;

the step of sensing via said sensor a vehicle traveling in said traffic lane in a generally opposite direction to said first direction and sending a signal via said processor to said road modules and/or one or more light strips to illuminate and/or flash in response to said vehicle traveling in said road lane in a generally opposite direction to said first direction.

2. The method of providing enhanced traffic signaling of claim 1, wherein said sensor is integral in a road module.

3. The method of providing enhanced traffic signaling of claim 1, wherein said road modules and/or one or more light strips are embedded in a lane of an interstate highway ramp.

4. The method of providing enhanced traffic signaling of claim 1, wherein said road modules and/or one or more light strips comprise a solar module and/or a vibration energy harvesting device and an energy storage device.

5. The method of providing enhanced traffic signaling of claim 1, wherein said step of providing at least one processor in connection with said sensor comprises providing at least one processor in connection with said sensor.

6. The method of providing enhanced traffic signaling of claim 1, wherein said step of providing at least one processor in connection with said sensor comprises providing at least one processor in connection with said sensor and configured for communication with an autonomous vehicle to direct the vehicle to stop, reverse direction, and/or move out of the lane comprising the first direction of traffic.

7. The method of providing enhanced traffic signaling of claim 1, wherein said step of providing at least one processor in connection with said sensor comprises providing a processor configured to contact traffic authorities to provide said traffic authorities with notice when a vehicle is traveling in a direction generally opposite to said first direction.

8. The method of providing enhanced traffic signaling of claim 1, wherein said step of providing at least one processor comprises the step of providing a processor configured to communicate with a computer located in a vehicle, wherein said processor is configured to communicate to said vehicle that said vehicle is traveling in the incorrect direction when said vehicle is traveling in the incorrect direction in said road lane.

9. The method of providing enhanced traffic signaling of claim 1, wherein said receiver is configured for wireless communication with said processor.

10. The method of providing enhanced traffic signaling of claim 1, wherein said receiver is configured for wired communication with said processor.

11. The method of providing enhanced traffic signaling of claim 1, wherein said road modules and/or light strips are connected to a solar energy collector to provide power to the road modules and/or light strips.

12. The method of providing enhanced traffic signaling of claim 11, wherein said solar connector is connected to an energy storage device configured for storage of energy collected by said solar collector.

13. The method of providing enhanced traffic signaling of claim 12, wherein said energy storage device comprises a battery.

14. The method of providing enhanced traffic signaling of claim 1, wherein said method comprises the step of said processor communicating with an upstream warning system configured to warn traffic traveling in said first direction on a road of a presence of a vehicle traveling in an incorrect direction toward said upstream warning system.

15. The method of providing enhanced traffic signaling of claim 1, wherein said method comprises the step of said processor communicating with an upstream warning system configured to warn traffic traveling in said road lane in said first direction of a presence of a vehicle traveling in an incorrect direction toward said warning system.

16. The method of providing enhanced traffic signaling of claim 14, wherein said warning system is at an upstream interstate onramp, wherein said processor is configured to communicate to said upstream warning system to illuminate and/or flash when a vehicle is traveling in an incorrect direction toward said upstream warning system.

* * * * *